US008155896B2

(12) United States Patent
Wargo et al.

(10) Patent No.: US 8,155,896 B2
(45) Date of Patent: Apr. 10, 2012

(54) FLUID FLOW MEASURING AND PROPORTIONAL FLUID FLOW CONTROL DEVICE

(75) Inventors: Christopher Wargo, Wellesley, MA (US); J. Karl Niermeyer, Tyngsboro, MA (US); Jieh-Hwa Shyu, Andover, MA (US); Craig L. Brodeur, Marlborough, MA (US); William Basser, North Adams, MA (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 13/016,255

(22) Filed: Jan. 28, 2011

(65) Prior Publication Data
US 2011/0248043 A1 Oct. 13, 2011

Related U.S. Application Data

(62) Division of application No. 12/253,732, filed on Oct. 17, 2008, now Pat. No. 7,885,773, which is a division of application No. 11/897,740, filed on Aug. 31, 2007, now Pat. No. 7,447,600, which is a division of application No. 10/521,697, filed as application No. PCT/US03/22533 on Jul. 18, 2003, now Pat. No. 7,292,945.

(60) Provisional application No. 60/397,053, filed on Jul. 19, 2002, provisional application No. 60/397,162, filed on Jul. 19, 2002.

(51) Int. Cl.
*G06F 19/00* (2011.01)
(52) U.S. Cl. ............................................ 702/50; 73/1.16
(58) Field of Classification Search .................. 702/50, 702/130, 182–185; 73/1.01, 1.02, 1.16, 1.57
See application file for complete search history.

(56) References Cited

U.S. PATENT DOCUMENTS

| 5,469,749 A | 11/1995 | Shimada |
| 5,475,614 A | 12/1995 | Tofte |
| 5,890,490 A | 4/1999 | Aylsworth |
| 6,352,001 B1 | 3/2002 | Wickert |

(Continued)

FOREIGN PATENT DOCUMENTS

JP 04-117503 4/1992

(Continued)

OTHER PUBLICATIONS

Office Action and English translation for Korean Patent Application No. 10-2005-7001058, mailed Aug. 27, 2011, 10 pgs.

(Continued)

*Primary Examiner* — Edward Raymond
(74) *Attorney, Agent, or Firm* — Sprinkle IP Law Group

(57) ABSTRACT

Embodiments disclosed herein provide restrictive-flow flow measurement devices, valve improvements and signal control devices and processes that control the flow of liquids, including control processes for single-liquid calibration. In some embodiments, a fluid flow device can be calibrated using a single standard calibration fluid. The fluid flow of a first fluid through a flow meter is measured by calculating a first pressure difference between pressures sensed by two pressure sensors of the flow meter. The fluid flow of a second fluid through the flow meter is measured by calculating a second pressure difference between pressures sensed by the same two pressure sensors. A calibration coefficient is determined based upon the relationship between the flow rate, the fluid density and the calculated pressure difference for the first and second fluids. A relationship between the calibration coefficient and the kinematic viscosity of each fluid is then determined and stored.

20 Claims, 20 Drawing Sheets

U.S. PATENT DOCUMENTS

| | | | |
|---|---|---|---|
| 6,564,824 B2 | 5/2003 | Lowery | |
| 6,578,435 B2 | 6/2003 | Gould | |
| 6,601,005 B1 | 7/2003 | Eryurek | |
| 6,662,140 B2 | 12/2003 | Martis | |
| 6,766,817 B2 | 7/2004 | da Silva | |
| 6,874,480 B1 | 4/2005 | Ismailov | |
| 6,918,404 B2 | 7/2005 | da Silva | |
| 7,066,586 B2 | 6/2006 | da Silva | |
| 7,285,255 B2 | 10/2007 | Kadlec | |
| 7,292,945 B2 | 11/2007 | Wargo et al. | |
| 7,447,600 B2 | 11/2008 | Wargo et al. | |
| 7,885,773 B2 | 2/2011 | Wargo et al. | |
| 2003/0236643 A1* | 12/2003 | Shajii et al. | 702/100 |
| 2007/0137296 A1* | 6/2007 | Krivitski et al. | 73/196 |
| 2008/0091306 A1* | 4/2008 | Shajii et al. | 700/282 |

FOREIGN PATENT DOCUMENTS

| | | |
|---|---|---|
| JP | 05-79871 | 3/1993 |
| JP | 06-007715 | 1/1994 |
| JP | 06-168134 | 6/1994 |
| JP | 07-13632 | 1/1995 |
| JP | 07-319551 | 12/1995 |
| JP | 09-228866 | 9/1997 |
| JP | 200182991 | 3/2001 |
| JP | 2001242940 A | 7/2001 |

OTHER PUBLICATIONS

Office Action and English Translation for Japanese Patent Application No. 2004-523582, mailed Sep. 13, 2011, 10 pgs.

Adgar, Adam et al., "Classical, Fuzzy and Genetic Algorithm Tuning Methods for PID Controllers: A Comparison Study Using an Industrial Flow Loop," vol. 42, No. 3, 2001, Univ. of Sunderland, Sunderland, GB, 6 pgs.

Cox, Earl, "Fuzzy Fundamentals," vol. 29, No. 10, Oct. 1992, IEEE Spectrum, New York, US, 4 pgs.

Hwang, Rey-Chue et al., "A New Fuzzy PID-Like Controller," 2000 IEEE Int'l Conf., Nashville, TN, vol. 5, Oct. 8-11, 2000, 6 pgs.

International Search Report for PCT/US03/22533, mailed Jul. 23, 2004, 11 pgs.

European Patent Office, Supplementary European Search Report, EP 03765744, dated Jul. 31, 2006, 5 pgs.

European Patent Office, European Examination Report for EP 03765744.2, dated Jan. 21, 2009, 5 pgs.

Written Opinion, International Preliminary Examining Authority, PCT/US03/22533, mailed Dec. 22, 2004, 5 pgs.

International Preliminary Report on Patentability for PCT/US03/22533, completed Mar. 14, 2005, 3 pgs.

English translation of Official Action for Chinese Patent Application No. 03821993.X, dated Jul. 27, 2007, 4 pgs.

Official Action for Japanese Patent Application No. 2004-523582, dated Aug. 5, 2009, with English translation, 7 pgs.

Official Action for Taiwanese Patent Application No. 92119667, dated Nov. 3, 2006, with English translation, 15 pgs.

Office Action for Japanese Patent Application No. JP2004-523582, dated Aug. 11, 2010, with English translation, 6 pgs.

Design of Fuzzy Controller for the Flow Control Valve, Automation Office, Japan, Editing Committee of Japan Automation Association, Oct. 21, 1994, vol. 15, No. 3 and 4, p. 118-123.

Office Action and its English translation issued for Korean Patent Application No. 10-2010-7020098, mailed Dec. 6, 2010, 7 pgs.

Notice of Allowance for U.S. Appl. No. 12/253,732, mailed Aug. 13, 2010, 8 pgs.

Final Rejection and English Translation for Korean Patent Application No. 10-2010-7020098, mailed Sep. 20, 2011, 6 pgs.

* cited by examiner

Eccentric flat channel venturi

As long as the fluid speed is sufficiently subsonic ($V <$ mach 0.3), the incompressible Bernoulli's equation describes the flow. Applying this equation to a streamline traveling down the axis of the horizontal tube gives, $$p_a - p_b = \Delta p = \frac{1}{2}\rho V_b^2 - \frac{1}{2}\rho V_a^2$$

From continuity, the throat velocity $V_b$ can be substituted out of the above equation to give, $$\Delta p = \frac{1}{2}\rho V_a^2 \left[\left(\frac{A_g}{A_b}\right)^2 - 1\right]$$

Solving for the upstream velocity $V_a$ and multiplying by the cross-sectional area $A_g$ gives the volumetric flowrate $Q$, $$Q = \sqrt{\frac{2\Delta p}{\rho}} \frac{A_g}{\sqrt{\left(\frac{A_g}{A_b}\right)^2 - 1}}$$

Ideal, inviscid fluids would obey the above equation. The small amounts of energy converted into heat within viscous boundary layers tend to lower the actual velocity of real fluids somewhat. A discharge coefficient $C$ is typically introduced to account for the viscosity of fluids, $$Q = C\sqrt{\frac{2\Delta p}{\rho}} \frac{A_g}{\sqrt{\left(\frac{A_g}{A_b}\right)^2 - 1}}$$

FIG. 22

FLUID FLOW MEASURING AND PROPORTIONAL FLUID FLOW CONTROL DEVICE

CROSS-REFERENCE TO RELATED APPLICATIONS

This is a divisional application of U.S. patent application Ser. No. 12/253,732, filed Oct. 17, 2008 now U.S. Pat. No. 7,885,773, now allowed, which is a divisional of U.S. patent application Ser. No. 11/897,740, filed Aug. 31, 2007, issued as U.S. Pat. No. 7,447,600, entitled "FLUID FLOW MEASURING AND PROPORTIONAL FLUID FLOW CONTROL DEVICE," which is a divisional of U.S. patent application Ser. No. 10/521,697, filed Jun. 14, 2005, issued as U.S. Pat. No. 7,292,945, entitled "FLUID FLOW MEASURING AND PROPORTIONAL FLUID FLOW CONTROL DEVICE," which claims priority from PCT Application No. PCT/US03/022533, filed Jul. 18, 2003, entitled "FLUID FLOW MEASURING AND PROPORTIONAL FLUID FLOW CONTROL DEVICE," which claims priority from U.S. Provisional Application Nos. 60/397,053, filed Jul. 19, 2002, entitled "LIQUID FLOW CONTROLLER AND PRECISION DISPENSE APPARATUS AND SYSTEM" and 60/397,162, filed Jul. 19, 2002, entitled "FLUID FLOW MEASURING AND PROPORTIONAL FLUID FLOW CONTROL DEVICE," the disclosures of which are fully incorporated herein by reference. The present application relates to U.S. patent application Ser. No. 09/991,392, filed Nov. 16, 2001, issued as U.S. Pat. No. 6,527,862, entitled "FLOW CONTROLLER," which is a divisional application of U.S. patent application Ser. No. 09/488,146, filed Jan. 20, 2000, issued as U.S. Pat. No. 6,348,098, entitled "FLOW CONTROLLER," both of which claim priority from U.S. Provisional Application Nos. 60/116,511, filed Jan. 20, 1999, entitled "UNIVERSAL EXTERNAL STOP/SUCKBACK VALVE CONTROLLER," and 60/143,370, filed Jul. 12, 1999, entitled "UNIVERSAL EXTERNAL STOP/SUCKBACK VALVE CONTROLLER," the disclosures of which are hereby incorporated by reference. The present application also relates to U.S. patent application Ser. No. 10/489,288, filed Mar. 11, 2004, issued as U.S. Pat. No. 7,249,628, entitled "APPARATUS FOR CONDITIONING THE TEMPERATURE OF A FLUID," which claims priority from PCT Application No. PCT/US02/30494, filed Sep. 26, 2002, entitled "APPARATUS FOR CONDITIONING THE TEMPERATURE OF A FLUID," which claims priority from U.S. Provisional Application No. 60/326,357, filed Oct. 1, 2001, entitled "CLOSED LOOP HEAT EXCHANGE APPARATUS," the disclosures of which are hereby incorporated by reference.

BACKGROUND

The present invention relates to the field of flow measurement and specifically the sensing of flow in aggressive, ultra-pure chemicals such as those typically used in semiconductor manufacturing. The present invention allows for the determination of a fluid flow rate based on differential pressure caused by a flow restriction. The pressure signals are processed by a DSP based electronic circuit, quantified by a microprocessor, and communicated to the end-user via a PC based graphical user interface or other display. The differential pressure sensor is highly accurate owing to the dimensions of the flow restriction and pressure sensor cavities, and permits pressure measurement in the restriction region in order to generate a large differential pressure. This maximized pressure differential increases the sensitivity and accuracy of the final flow rate measurement. Also, the dimensions of these critical regions reduce the overall pressure loss due to the measurement, a further enhancement over existing designs and of substantial benefit when measuring aggressive, high-purity fluids at relatively low flow rates.

During the manufacture of semiconductors, many different fluids must be precisely and accurately dispensed and deposited on the substrate being treated, such as deionized water, photoresist, spin on dielectrics, polyimides, developer and chemical mechanical polishing (CMP) slurries, to name a few. For example, in conventional apparatus for such applications, wafers to be processed are positioned beneath a suitable nozzle that then dispenses a predetermined amount of liquid or slurry to coat or treat the wafer. The predetermined amount is premised on pump cycles, tubing diameters and other characteristics of the fluid containment environment, not on the absolute amount or mass of fluid deposited on the wafer. Typically the wafer is then rotated to disperse the deposited liquid evenly over the entire surface of the wafer. It is readily apparent that the rate of dispensing and the amount of liquid dispensed are critical in this process.

When fluid flow is stopped through the nozzle, such as between wafer treatments, the potential exists for droplets of liquid from the nozzle to form and fall onto the wafer positioned below the nozzle. This can destroy the pattern being formed on the wafer, requiring that the wafer be discarded or reprocessed. In order to avoid the formation of deleterious droplets on the nozzle, external suckback or stop/suckback valves are commonly used. The latter such valves are typically a dual pneumatically controlled valve pair, with one valve stopping the flow of liquid to the nozzle, and the other drawing the liquid back from the dispense end or outlet port of the nozzle. This not only helps prevent droplet formation and dripping at the port, but also helps prevent drying of the exposed surface of the liquid, which can lead to clogging of the nozzle, and reduces fluid contamination at the outlet.

The coating of larger wafers (e.g., 300 mm in diameter and larger) is also problematic, as turbulence issues arise. The rotational speed of the wafer is conventionally used to spread the coating fluid from the center of the wafer where it is applied, radially outwardly to the edge of the wafer. However, this approach creates turbulent air flow over the wafer and can result in uneven or nonuniform coatings. Reducing the spin speed with larger wafers reduces the turbulence at the surface of the wafer, but can introduce new problems. With the reduced speed, the fluid moves across the wafer more slowly, and thus spreading the fluid to the wafer edge before the fluid begins to setup or dry becomes an issue.

Pumps conventionally have been used to dispense liquids in semiconductor manufacturing operations. However, the pumps suitable for such applications are expensive and require frequent replacement due to excessive wear.

It therefore would be desirable to provide a valve system that results in precise, reproducible dispensing of fluid without the foregoing disadvantages. Such a valve system should not be affected by changes in fluid temperature or effects of upstream fluid pressure. In addition, the present invention has broader applications to any fluid control device, especially where precise control of fluid flow is desired or required.

SUMMARY

The problems of the prior art have been overcome by the present invention, which provides a fluid flow measuring and proportional fluid flow control device. The device controls fluid flow using a proportioning valve in response to a pressure loss measured in a flow restriction element. Pressure is sensed at or near the inlet and at or near the outlet of the restrictive flow element, and the resulting pressure drop therebetween is converted to a flow rate of the fluid being controlled. The pressure drop can be continually or continuously monitored, and one or more valves modulated to obtain the desired flow rate. The control system has applicability to fluids having a wide range of viscosities, it being capable of accurately and repeatably dispensing such fluids with minimal operator involvement. It offers accurate and repeatable performance in a cost-effective and flexible manner, responding quickly to real-time process variations. In a preferred embodiment, the design of the pressure drop element allows recovery of most of the pressure loss due to the restrictive element.

Another embodiment of the present invention can include a proportional flow valve having a fluid inlet and a fluid outlet; an actuator for the proportional flow valve for modulating the proportional flow valve; a restrictive flow element having a restrictive flow element fluid inlet and a restrictive flow element fluid outlet in fluid communication with the fluid inlet of the proportional flow valve, the restrictive flow element creating a pressure drop between the restrictive flow element fluid inlet and restrictive flow element fluid outlet; an upstream pressure sensor; a downstream pressure sensor; and a controller in communication with the upstream pressure sensor and the downstream pressure sensor. The controller can further comprise one or more processors; one or more computer readable memories; and a set of computer readable instructions stored on the one or more computer readable memories and executable by the one or more processors. The set of computer readable can comprise instructions executable to receive an upstream pressure signal; receive a downstream pressure signal; and calculate a fluid flow rate based on the upstream pressure signal and the downstream pressure signal.

Yet another embodiment of the present invention can include a device comprising a set of computer readable instructions stored on one or more computer readable memories and executable by the one or more processors, the set of computer readable instructions comprising instructions executable to calculate a fluid flow and calculate an overall change in valve output based on fuzzy logic.

Yet another embodiment of the present invention can include a device comprising a set of computer readable instructions stored on one or more computer readable memories and executable by the one or more processors, the set of computer readable instructions comprising instructions executable to: calculate a fluid flow rate and calculate an overall change in valve output based on fuzzy logic. The overall change in valve output can be calculated by comparing an error to a first set of membership functions to generate a first set of fuzzy inputs; comparing a change in flow rate to a second set of membership functions to generate a second set of fuzzy inputs, wherein each fuzzy input from the first set of fuzzy inputs and the second set of fuzzy inputs is associated with an input degree of truth; applying a set of rules to the first set of fuzzy inputs and the second set of fuzzy inputs to generate a set of fuzzy outputs, wherein each fuzzy output is associated with an output degree of truth; associating each fuzzy output with a discrete change in valve output value; and calculating the overall change in valve output based on the output degree of truth of one or more of the fuzzy outputs and the discrete change in valve output value associated with each of the one or more fuzzy outputs.

Embodiments of the present invention provide an advantage over prior art PID controllers, because it can provide greater stability.

Embodiments of the present invention provide an advantage over prior art PID controllers, because it can be used over a greater set of operating conditions because the fuzzy logic can be programmed to account for changes in operating environment.

BRIEF DESCRIPTION OF THE DRAWINGS

FIG. 22 is a description of the theory relating fluid flow in a venturi to pressure drop, cross sectional area, and fluid properties.

DETAILED DESCRIPTION

Figure 1:
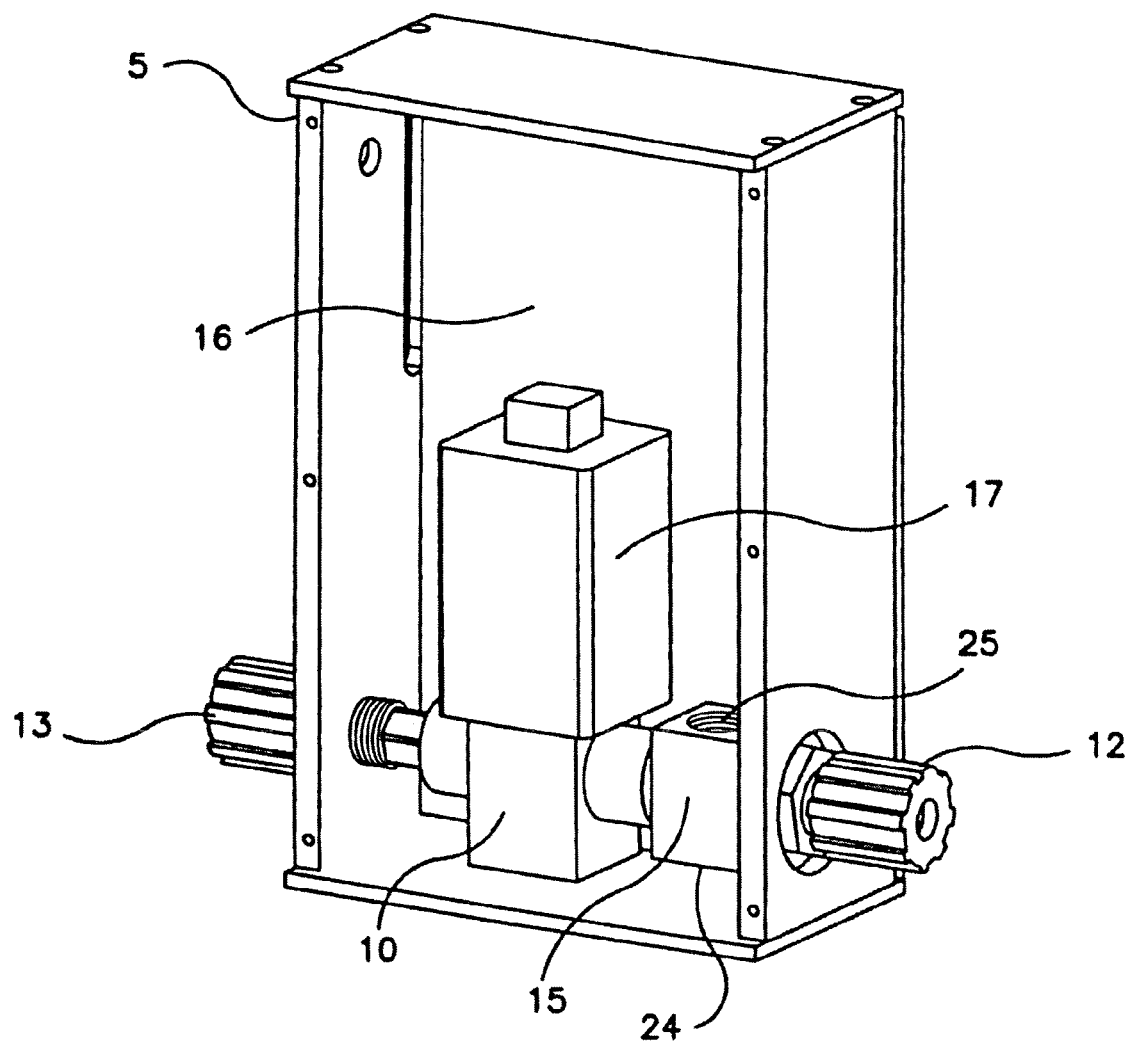
FIG. 1 is a perspective view of a housing including the restrictive flow element and proportional valve in accordance with an embodiment of the present invention.
Figure 13:
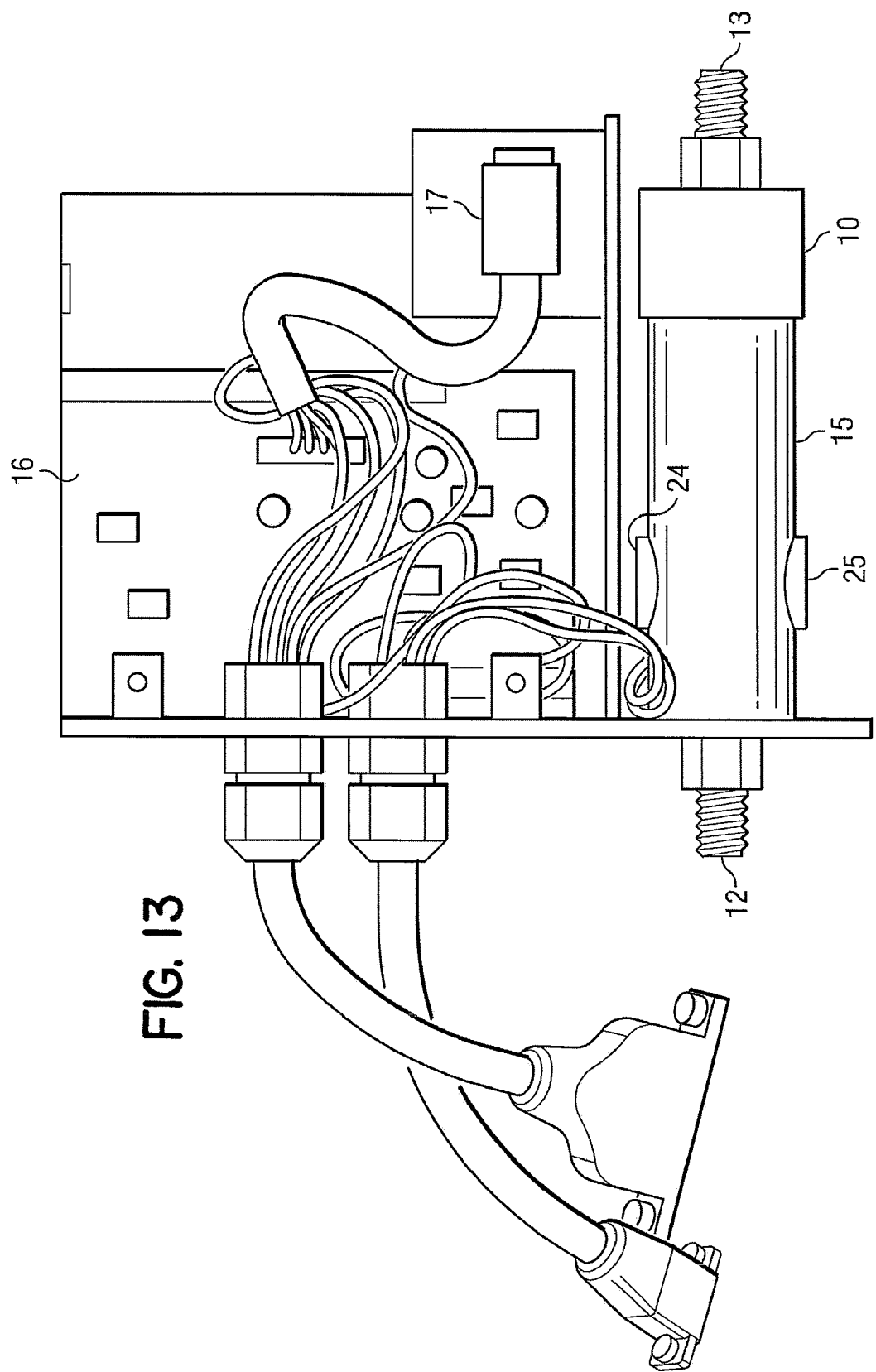
FIG. 13 is a picture of an embodiment of the present invention illustrating flow restriction element, proportioning valve, and electronics system.

Turning first to FIG. 1, there is shown the fluid flow measuring and proportional fluid flow control device assembled in housing 5 in accordance with a preferred embodiment of the present invention. A fluid control device such as a stepper motor actuated proportional valve 10 is shown having a fluid inlet line 12 and a fluid outlet line 13 for ultimate dispensing of the liquid to a point of use, such as a substrate which can be a wafer (not shown). In fluid communication with the fluid inlet line 12 is a restrictive flow element 15. Preferably the restrictive flow element 15 is a venturi as discussed in greater detail below. A first pressure sensor 24 such as a pressure transducer is positioned at or near the inlet of the restrictive flow element 15 to sense a first pressure, and a second pressure sensor 25 such as a pressure transducer is positioned at or near the outlet of the restrictive flow element 15 to sense a second pressure. FIG. 13 is a picture of an exemplary setup using two sensors 24 and 25. Alternatively, a single differential pressure sensing device could be used. The portion of the pressure sensor(s) that contact the fluid is preferably made of an inert material (with respect to the fluid used in the application) such as sapphire. Two pressures are measured of a fluid stream; the first is a measurement of the fluid pressure of the fluid inline, just prior to an induced pressure drop in the flow sensor, and the second pressure measurement is taken at the point of the induced pressure drop. In the preferred embodiment, the pressure drop is induced by a reduced cross section in the fluid line. This sudden reduced cross section causes the fluid velocity to increase in this section, thereby reducing the fluid pressure. The inlet and outlet of the reduced cross section is carefully designed so as to recover the parasitic pressure loss of the induced pressure drop, and a majority of the pressure drop is recovered as the fluid line is expanded and the fluid velocity recovers. This design is commonly referred to as a venturi style, as long as the second pressure measurement is taken immediately at the point of constriction, in the throat of the device. This will allow for the maximum pressure differential signal to be generated. Other embodiments of the system could invoke a pressure drop through the use of a metering orifice, a capillary, a series of parallel capillaries, or porous media. Such restrictive flow elements should be chemically inert to the fluid and can be made of Teflon®, PFA, MFA, FEP, PVDF, and ultrahigh molecular weight polyethylene. The pressure sensors in the present embodiment include sapphire diaphragms, thin-film piezoresistive pressure sensors available from Tenzor LLC (Basking Ridge, N.J.) and SST diaphragm pressure sensors available from Lucas Novasensor (Fremont, Calif.) as p/n NPI-19A-701 GH with a protective barrier to ensure chemical compatibility with the fluids used in the manufacture of semiconductor chips. Other embodiments could use ceramic or silicon thin-film film piezoresistive pressure sensors with a protective barrier, or differential pressure sensors of many forms. A proportional valve actuator 17 actuates the valve 10. An electronic board 16 is mounted in housing 5 as shown.

Figure 2:
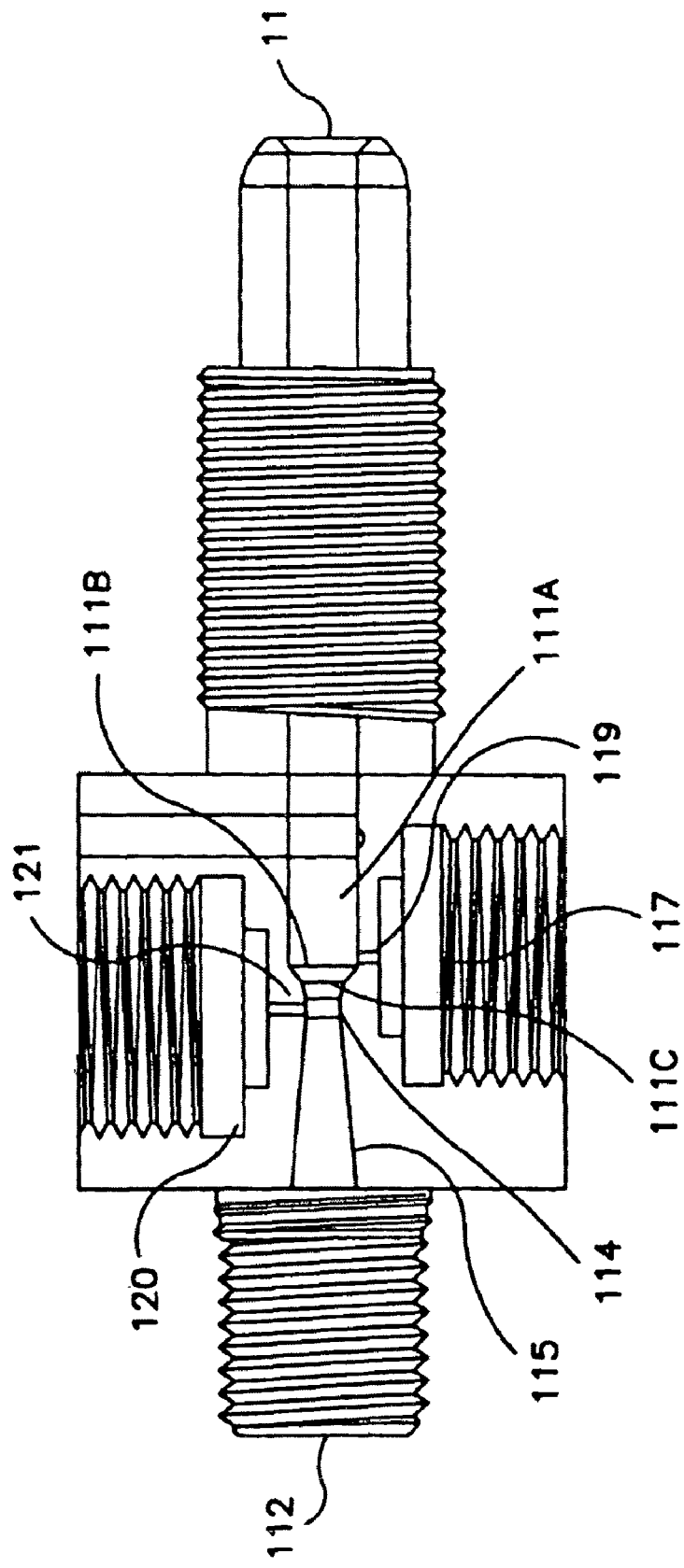
FIG. 2 is a diagram of a concentric venturi in accordance with an embodiment of the present invention.
Figure 3:
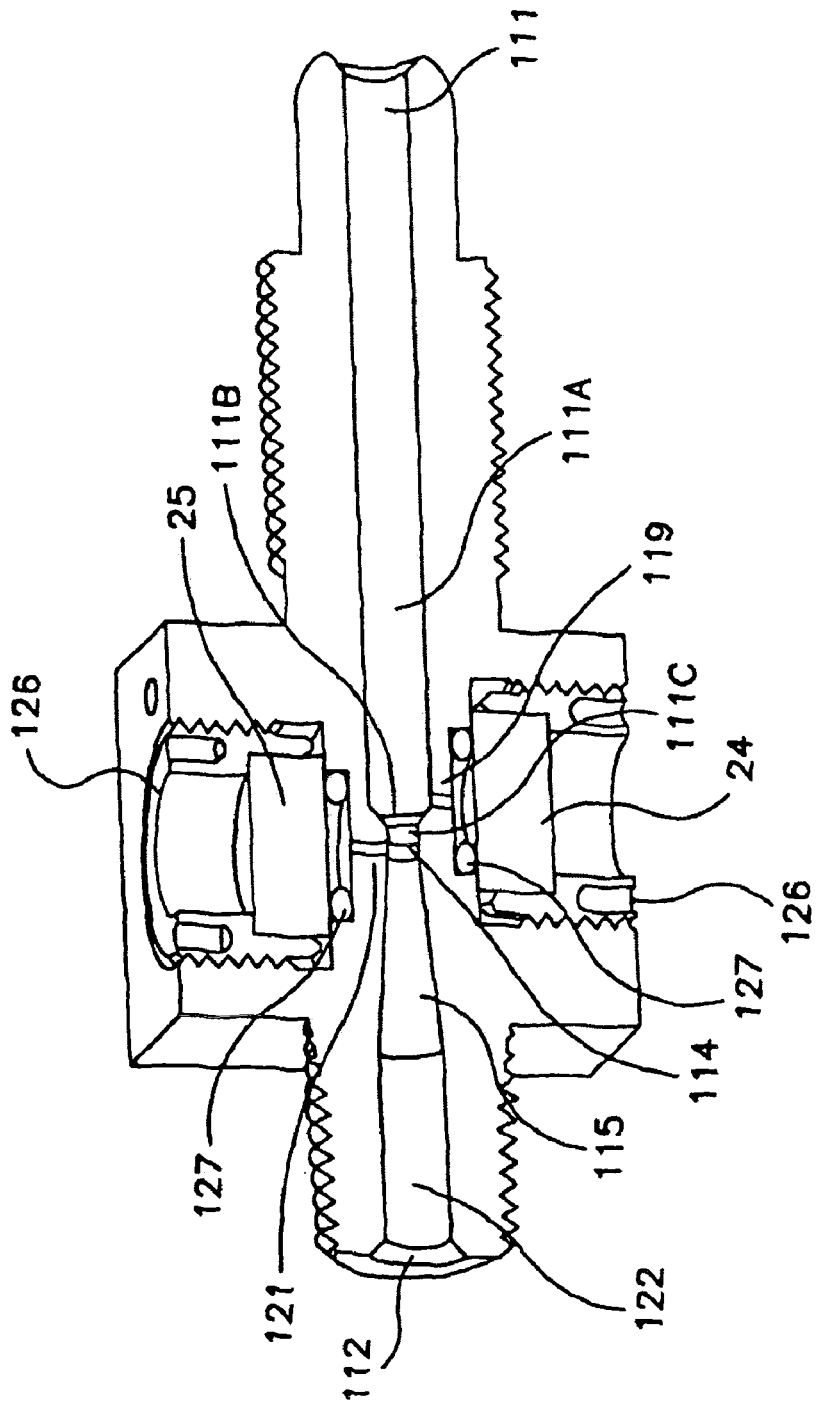
FIG. 3 is a cross-sectional view of the concentric venturi of FIG. 1.

FIGS. 2 and 3 illustrate one embodiment of the restrictive flow element 15 in accordance with the present invention. The element 15 has a fluid inlet 111 and a fluid outlet 112 spaced from the inlet 111. The fluid inlet 111 is in communication with a first inlet section 111A of substantially constant cross-section. The first inlet section 111A terminates at a first convergent section 111B that tapers to a smaller cross-section as shown. The first convergent section 111B is in fluid communication with a second convergent section 111C of even smaller cross-section, which in turn is in fluid communication with the throat 114 of the venturi. A first divergent section 115 tapers from the throat section 114 so that it expands towards fluid outlet section 122 which is of substantially constant cross-section and communicates with outlet 112. A first pressure sensor cavity 117 housing a first pressure sensor 24 (FIG. 3) is in fluid communication with a first pressure sensor tap 119 communicating with first inlet section 111A, upstream of the venturi constriction. A second pressure sensor cavity 120 housing second pressure sensor 25 (FIG. 3) is in fluid communication with second pressure sensor tap 121 communicating with throat section 114, downstream of the constriction. Pressure taps have lengths that can range from 0.09 to 1 inch and have diameters ranging from 0.01 to 0.5 inches. Each pressure sensor is retained in its respective cavity by retainers 126 and is sealed with O-rings 127. Preferably the diameter of the minor cross section 114 is 0.7 or less of the major diameter 111A.

Figure 4:
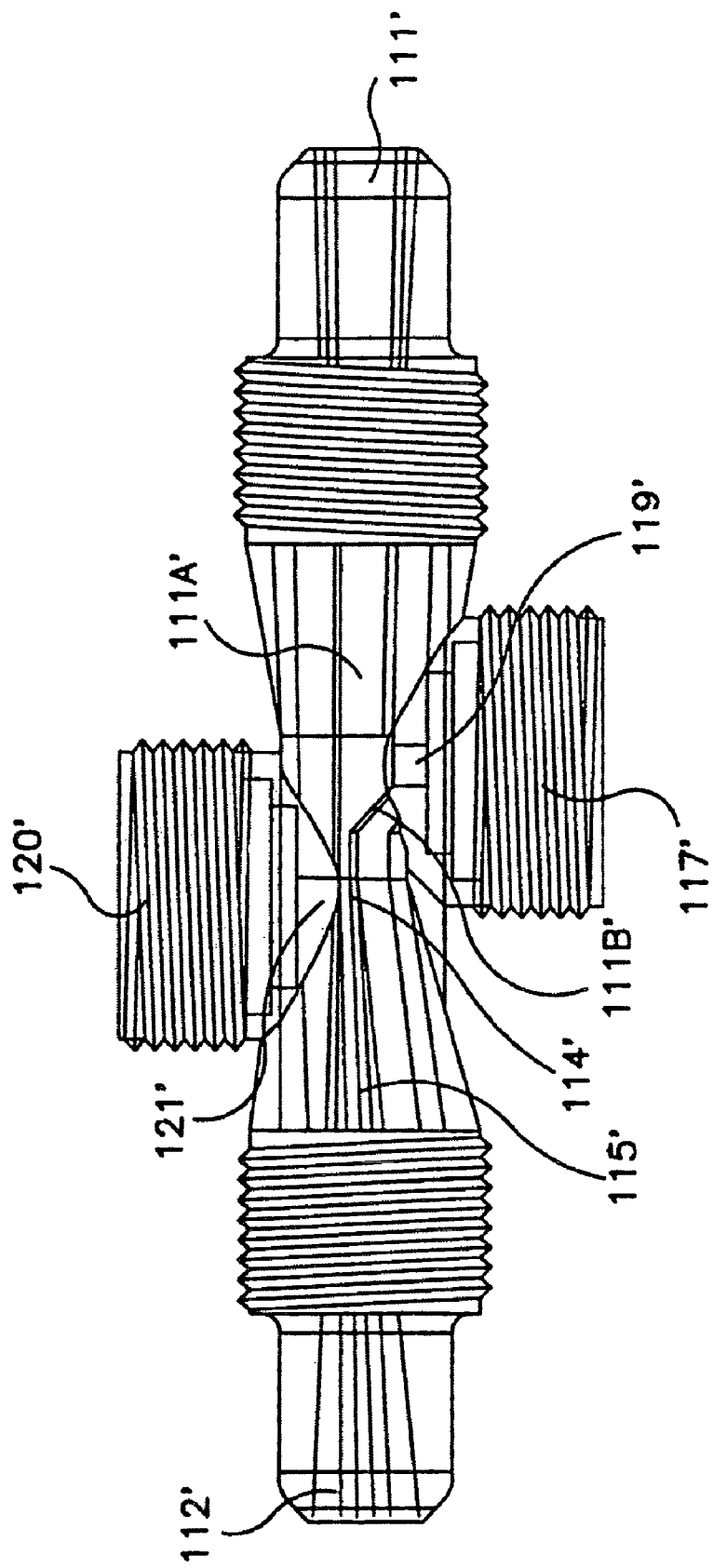
FIG. 4 is diagram of an eccentric flat channel venturi in accordance with another embodiment of the present invention.

FIG. 4 illustrates an alternative embodiment of the restrictive flow element 15, wherein the element is an eccentric flat channel venturi. Fluid inlet 111' is in fluid communication with convergent inlet section 111A', which narrows suddenly to convergent inlet section 111B' due to the tapered wall. The convergent inlet section 111B' is in fluid communication with the venturi throat 114', which then diverges outwardly in divergent outlet section 115' that ultimately reaches fluid outlet 112'. A first pressure sensor cavity 117' housing a first pressure sensor (not shown) is in fluid communication with a first pressure sensor tap 119' communicating with convergent inlet section 111A', upstream of the venturi constriction. A second pressure sensor cavity 120' housing second pressure sensor (not shown) is in fluid communication with second pressure sensor tap 121' communicating with throat section 114', downstream of the constriction. Each pressure sensor is retained in its respective cavity by retainers and is sealed with O-rings.

Fluid enters the device through the fluid inlet 12. Fluid passes from the fluid inlet 12 into the flow restriction element 15 where it passes through a first section which conditions the fluid profile. The pressure of the fluid in this section of the flow restriction is measured by a first pressure sensor 24 in fluid communication through a pressure tap 119 with the first section. In the embodiment of FIGS. 2 and 3, the fluid enters a first convergent section 111B and then a second convergent section 111C that increases the fluid velocity and decreases the pressure of the fluid. Fluid enters the throat 114 of the device where the pressure of the fluid is measured by a second pressure sensor 25 in fluid communication with the fluid in the throat 114 by a second pressure tap 121. Fluid exits the throat section of the flow element through a first divergent section 115. The first divergent section 115 of the flow element section is connected to a fluid outlet 12.

Figure 5:
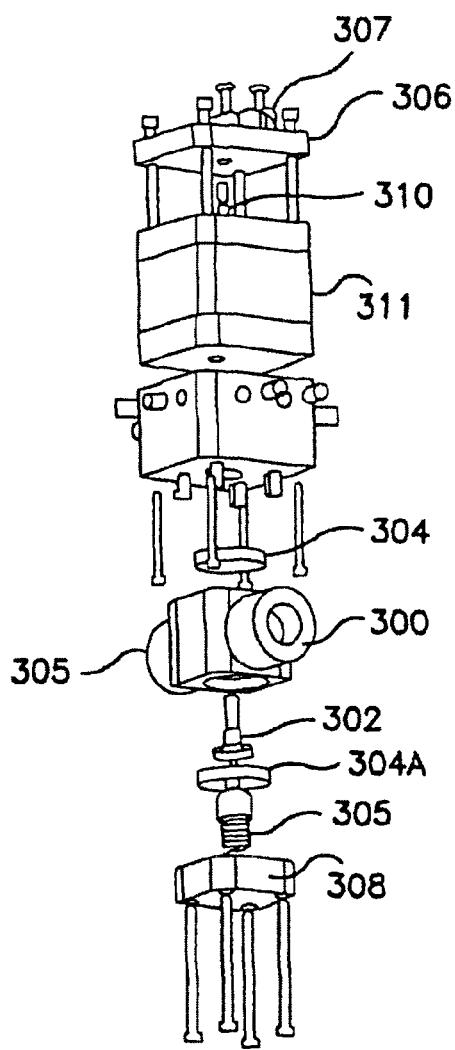
FIG. 5 is an exploded view of a proportional valve in accordance with an embodiment of the present invention.
Figure 6:
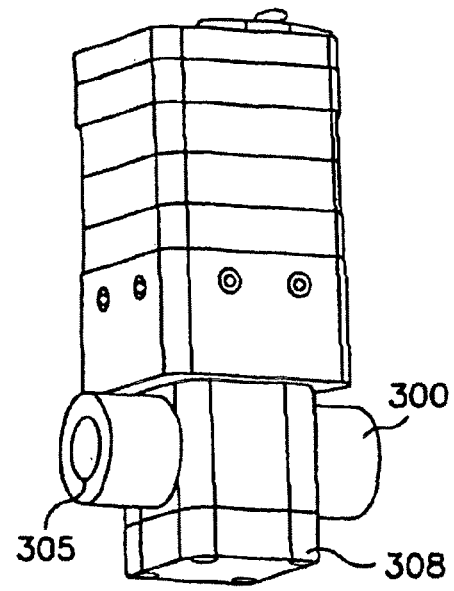
FIG. 6 is a perspective view of the valve of FIG. 5.

Fluid from the outlet of flow restriction element 15 enters the proportioning valve at its inlet. Referring to FIG. 5, a suitable proportioning valve 10 is shown having a path for fluid flow that includes an inlet 300, a valve poppet 302, a valve seat, and a fluid outlet 305. The valve poppet 302 is in contact with a depression in diaphragm 304 on one end and a diaphragm 304A and spring 305 seated in base 308 on the other end. This is a normally closed valve. The poppet 302 restricts flow of fluid past the valve seat. A sensor 307 is positioned on sensor spacer 306 to determine the "homing" position of the lead screw 310 of the stepper motor 311. To adjust the flow rate of the fluid in the fluid path, the stepper motor 311 will rotate, driving the lead screw 310. Movement of the lead screw 310 displaces the diaphragms 304 and 304a, moving the poppet 302 from the sealed position in the valve seat, allowing flow of fluid past the valve seat and poppet 302.

When the stepper motor reverses rotational direction, the lead screw retracts from the diaphragm and the return spring 308 displaces the diaphragms 304 and 304a, moving the poppet to restrict the flow of fluid in the flow path. The valve actuating mechanism in this embodiment is a stepper motor, but could also be a linear motor or other mechanical actuator, pneumatic actuator, voice coil, or other force actuators. The actuating mechanism is in communication with the electronics, which varies the commands sent to the actuator in response to the flow rate setpoint and the actual flow rate. In an alternative embodiment of the valve, the stepper ensures the closing of the valve, the valve is normally open, and the spring works in opposition to the stepper.

Figure 7:
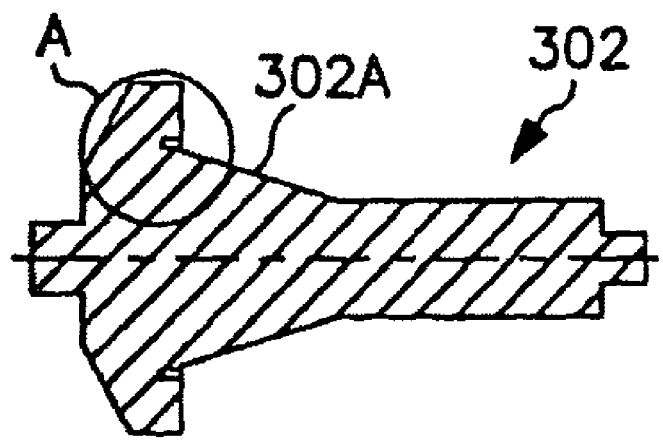
FIG. 7 is a cross-sectional view of a modified poppet for the valve of FIG. 5.
Figure 7A:
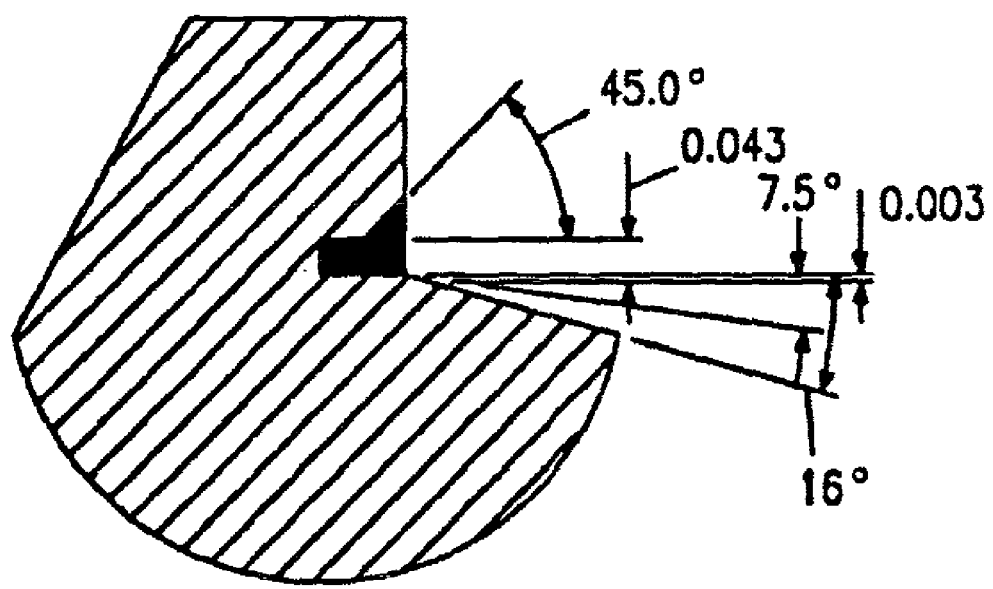
FIG. 7A is a cross-sectional enlarged view of a portion of the poppet of FIG. 7.
Figure 8:
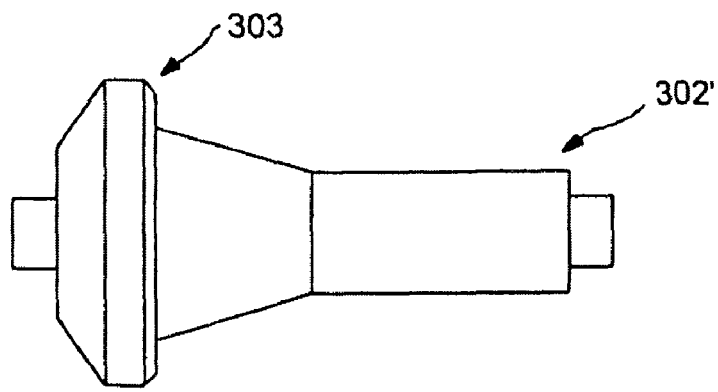
FIG. 8 is a side view of a modified poppet in accordance with another embodiment of the present invention.
Figure 9:
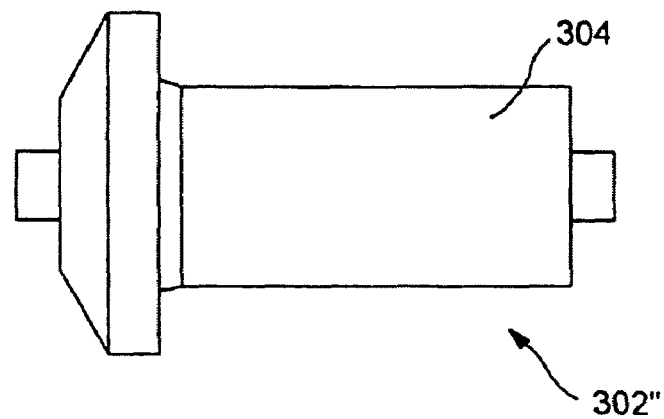
FIG. 9 is a side view of a modified poppet in accordance with still another embodiment of the present invention.
Figure 10:
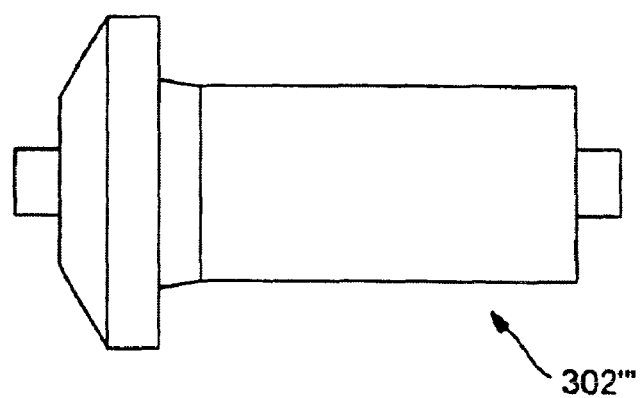
FIG. 10 is a side view of a modified poppet in accordance with yet another embodiment of the present invention.

Various poppet designs can be used depending upon desired response, linearity and seal area. For example, FIG. 7 shows a standard Parker/Partek poppet 302 that has been modified such that the cone 302A has a compound angle (7.5 degrees and 16 degrees as shown in FIG. 7A). The compound angle makes the flow response with respect to the poppet position more linear and thus easier to control. FIG. 8 shows a poppet 302' with a reduced diameter (relative to poppet 302 of FIG. 7) at the sealing area and a chamfer 303 imposed upon the corner near the seal area to reduce vibration. FIG. 9 shows a modified poppet 302" that includes the compound angles and also has a larger barrel 304 diameter for low flow applications. FIG. 10 shows poppet 302''' with a constant cone angle (no compound angle) but a larger barrel diameter for low flow applications. Most existing on/off high purity valves that utilize a diaphragm/poppet design can be made to proportion by such poppet modifications and incorporating the final new assembly with an appropriate actuator, and imbedding the actuator/valve assembly into a flow control system with a flow sensor, calculation and control logic, and the actuator/valve assembly.

Referring again to FIG. 1, actuator 17 is connected to the valve 10. Each pressure sensor 24, 25 (or a single differential pressure sensing device) is in communication with a computer processor or controller, such as a controller having proportional, integral and derivative (PID) feedback components or fuzzy logic control. Fuzzy logic control involves three steps referred to as fuzzification, rule evaluation, and defuzzification. Fuzzification is the process of quantifying analog input variables, such as flow rate error and the derivative of the flow rate with respect to time, into the degrees to which a small set of logical values is true. Rule evaluation involves taking the fuzzy input variables and generating a set of fuzzy outputs based on a set of rules or conditions. Defuzzification is the process of combining the raw fuzzy outputs into one composite system output. One system and method of Fuzzy Logic Control is discussed in conjunction with FIG. 20, below. Such output may be used to control a valve or a heater. As each sensor 24, 25 samples the pressure in its respective fluid line, it sends the sampled data to the controller. The controller compares the values and calculates a pressure drop across the restrictive flow element 15 as discussed in greater detail below. A signal from the controller based on that pressure drop is sent to the actuator 17, which modulates the fluid control valve 10 accordingly. Temperature and kinematic viscosity corrections can be made.

The controller can calculate a flow rate based on the pressure differential of two discrete pressure signals and temperature of the fluid, and compare the measured flow rate to a previously inputted set point flow rate and modulates the proportioning valve to achieve the flow rate set point. The controller can also total the total volume flowing through the fluid flow control device from the beginning of the cycle, and seals the valve when the total volume dispensed is equal to the volume set point inputted by the end user. In another embodiment, a flow rate set point is inputted as well as a time value set point (instead of a total volume set point). The loop can be exercised until the time measured since the start of dispense equals the set point inputted, and the valve is shut completely to complete the cycle.

A liquid compatible proportioning valve 10 provides flow rate modulation of the fluid stream. The assembly consists of two main components: the valve 10 and the actuator 17. In the preferred embodiment, the valve 10 is a diaphragm and poppet style device that efficiently controls the flow rate while minimizing the pressure drop caused by the valve. The valve diaphragms allow the fixturing and movement of the poppet, which modulates the flow rate by its position in an orifice. The poppet of a standard Parker/Partek (Tucson, Ariz.) PV-10 valve has been modified to provide for good proportioning of the flow rate through a wide flow range, as discussed above with reference to FIGS. 7-10. In another embodiment, a standard St. Gobain Performance Plastics (Garden Grove, Calif.) HPM with no additional poppet modifications can be used. The actuator provides the mechanical movement of the diaphragms, and hence the poppet. Isolated from the valve body, the actuator in the preferred embodiment is a stepper motor from EAD (Dover, N.H.), p/n L1MGE-10×03, and can be operated in primary steps or with micro-stepping to provide more precise movement of the diaphragm/poppet assembly. Other suitable actuators include linear motors, voice coils, and pneumatic styles.

Figure 21:
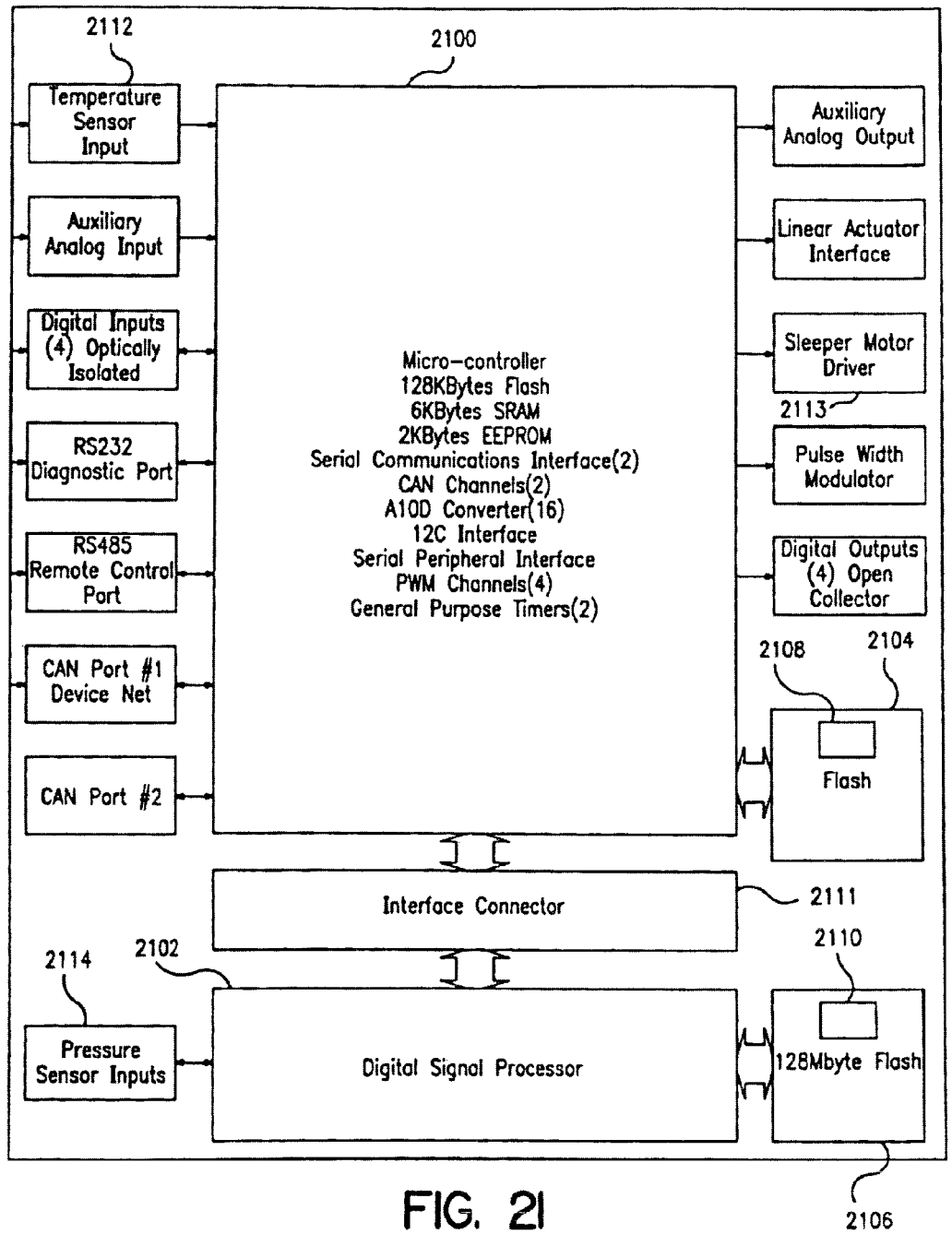
FIG. 21 is a block diagram of the signal processing and control section of the electronics system in accordance with the present invention.

FIG. 21 illustrates one embodiment of a controller that can calculate a flow rate for a liquid. In the embodiment of FIG. 21, the controller can include a central processing unit 2100 and a digital signal processor 2102. Each of central processing unit 2100 and digital signal processor 2102 can include or access computer readable memories (e.g., RAM, ROM, EPROM, Flash, external magnetic storage device or other computer readable memory known in the art). In the example of FIG. 21, central processing unit 2100 can access on-board FLASH memory 2104 and digital signal processor 2102 can access on board FLASH 2106. Each of Flash memory 2104 and Flash memory 2106 can store a set of computer readable instructions 2108 and 2110 that are executable by the respective processor. Digital signal processor 2102 and central processing unit 2100 can communicate via a standard or custom interface control 2111.

The controller can also include a temperature sensor input 2112 to receive a temperature signal from a temperature sensor, a stepper motor driver 2113 to generate a stepper motor drive signal based on the output of central processing unit 2100, pressure sensor inputs 2114 and any other inputs or outputs used for a particular implementation (e.g., analog and digital outputs, diagnostic ports, etc.).

In operation, the controller can use input signals from the individual pressure sensors and a temperature signal from a thermistor to calculate the final flow rate of a liquid. Alternatively, the output from a single differential pressure sensor could be used to calculate the final flow. Each pressure signal is processed via an analog to digital chip, then the signal is amplified, and the resultant signal is fed into digital signal processor 2102. This processor operates at a higher frequency than the central processing unit 2100 to allow for filtration of the pressure and temperature signals and does not impose a significant delay in the control loop response. Filtration of the signal can be necessary to reduce any extraneous noise (from the pressure sensor, from the system, or external) and allow for a more precise pressure measurement. This is useful when comparing two pressure signals. A differential pressure signal is then obtained.

Central processing unit 2100 can execute instructions 2108 to calculate a flow rate based on the differential pressure measurement and the fluid temperature. Temperature influences the pressure reading, the density, and the viscosity of the fluid, which impacts the calculation of the flow rate. The differential pressure signal is noted and correlated to a preliminary flow rate via a pre-loaded calibration curve. The calibration curve is dependent on the absolute dimensions of the fluid flow path, the dimensions of the restrictive region, and the response of the pressure sensor. There is a single curve per flow control system. The curve has been normalized for a model fluid. The resultant preliminary flow rate is further modified by the density and viscosity of the fluid at the measured temperature. Such stored data correlates the dependence of density and viscosity with temperature for the measured fluid. In a preferred embodiment, density and viscosity as a function of temperature for multiple liquids is stored as data either in tabular form or as mathematical functions. The preferred embodiment utilizes a microprocessor from Motorola p/n MC68HC912DG128 (Shaumberg, Ill.) for the final calculations. The final flow rate for the fluid of interest is then noted.

It should be noted that while the computer readable instructions are stored between multiple memories and executed by multiple processors, the instructions can be stored on one or more computer readable memories and be executed by one or more processors. Furthermore, as would be understood by one of ordinary skill in the art, the computer readable instructions can be implemented as software, firmware and/or hardware.

Figure 20:
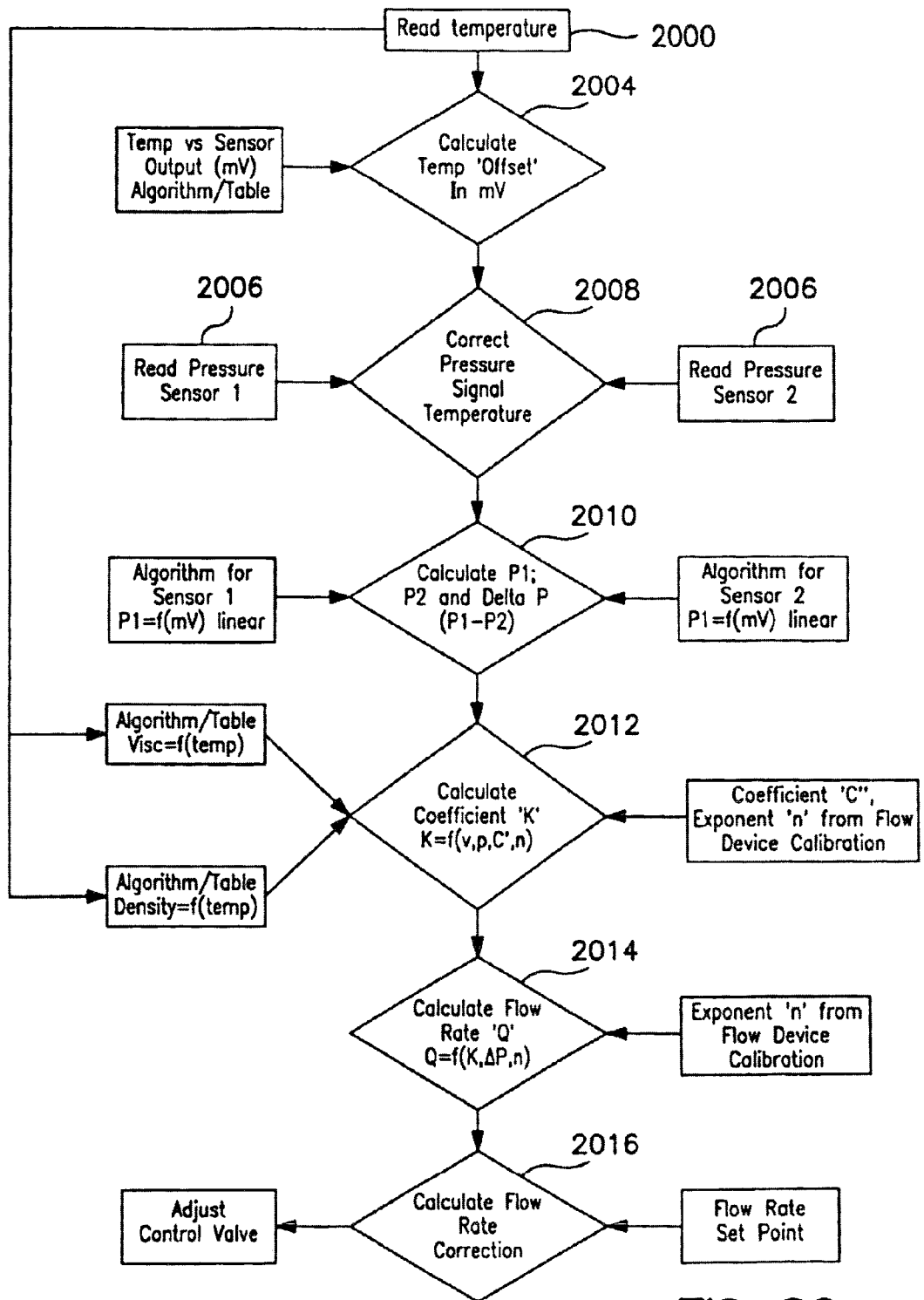
FIG. 20 is a flow chart of the control system in accordance with the present invention.

FIG. 20 is a flow chart illustrating a flow rate computation. In one embodiment of the present invention, the methodology of FIG. 20 can be carried out by executing, with one or more processors, computer readable instructions that are stored on a computer readable memory (e.g., RAM, ROM, FLASH, magnetic storage, or other computer readable memory known in the art). The controller, at step 2002, can read a temperature (e.g., through temperature input 2112 of FIG. 21). At step 2004, the controller can access temperature verses sensor tables to calculate a temperature offset. At step 2006, the controller can read pressure signals (e.g., through pressure sensor inputs 2114 of FIG. 21) and, at step 2008, correct the pressure signals for the temperature offset. The controller can then calculate P1, P2 and the difference in pressures based on the pressure signals and algorithms associated with each pressure sensor (step 2010).

At step 2012, the controller can calculate an initial flow rate based on the pressure differential and correlate it to a preliminary flow rate via a pre-loaded calibration curve. The calibration curve can be dependent on the absolute dimensions of the fluid flow path, the dimensions of the restrictive region, and the response of the pressure sensor. There can be a single curve per flow control system. In the preferred embodiment, the curve has been normalized for a model fluid. Additionally, at step 2012, the controller can modify the initial flow rate based on viscosity and density. The controller, at step 2014, can adjust the flow rate based the flow rate calibration to calculate a final flow rate. At step 2016, the controller can determine how much to correct the flow rate based on a set point. Based on the calculation of flow rate, the controller, at step 2018 can generate a signal to adjust a valve.

The calculation of how much to adjust the valve can involve fuzzy logic. The application of fuzzy logic involves three steps, fuzzification, rule evaluation and defuzzification. Fuzzification is the process of quantizing input variables into the degree to which a small set of logical values is true.

According to one embodiment of the present invention, a variable related to a flow rate and variable related with the change in flow rate over time can be compared to membership functions to determine a degree of truth for each membership function.

Figure 23B:
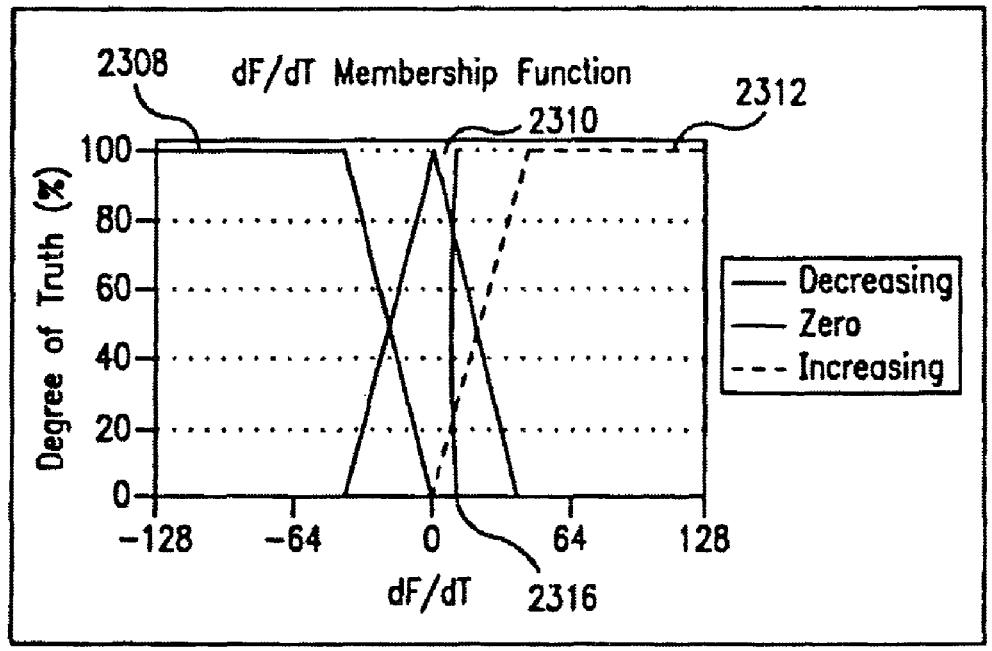
FIGS. 23A and 23B illustrate embodiments of membership functions that can be used in calculating an overall change in valve output.
Figure 23A:
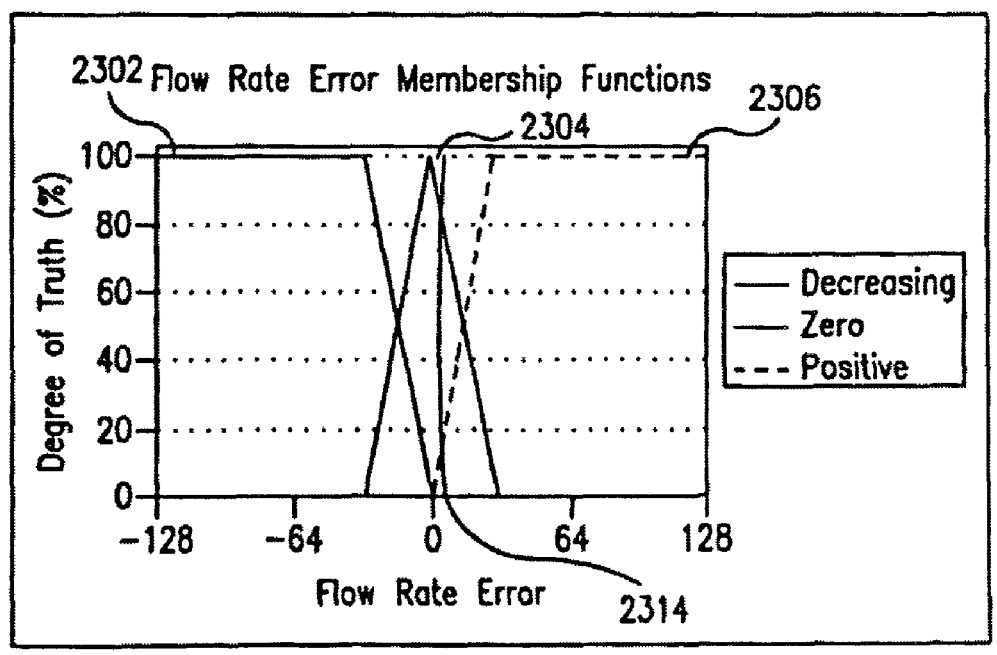

As an example, the controller can compare the flow rate error and change in flow over time (dF/dt) to membership functions. The flow rate error and dF/dt can be calculated in any manner known in the art. The error can be divided into three categories Negative, Zero and Positive. One embodiment of the membership functions for error is illustrated in FIG. 23A. In FIG. 23A, line 2302 represents the negative error membership function, 2304 the neutral zero error membership function and 2306 the positive error membership function. The dF/dt is also divided into three categories, Decreasing, Steady and Increasing. FIG. 23B illustrates the membership functions for these three categories. In FIG. 23B, line 2308 represents a decreasing dF/dt, line 2310 a steady dF/dt and line 2312 an increasing dF/dt. It should be noted that the membership functions in FIGS. 23A and 23B are provided by way of example only and the membership functions take any shape. In other embodiments of the present invention, additional or fewer membership functions can be defined for each variable.

The error value and dF/dt can be compared to the membership functions to determine a degree of truth. For example, if the value of the error is at point 2314, the degree of truth for each error membership function would be as follows: Negative 0%, Zero 90% and Positive 10%. Similarly, if dF/dt was at point 2316, the degree of truth for each dF/dt membership function would be: Decreasing 0%, Steady 80% and Increasing 20%. Thus, the fuzzification process determines how true a state is for a given input variable. Other inputs include for example, temperature, rate of change of temperature, pressure, rate of change of pressure or any other variables that can be translated to flow rate and/or change in flow rate.

Rules evaluation involves taking a set of fuzzy inputs (e.g., Negative 0%, Zero 90%, Positive 10%, Decreasing 0%, Steady 80% and Increasing 20%) and generating a set of fuzzy outputs. According to one embodiment of the present invention, the fuzzy output can be the change to be applied to a flow valve given a set of rules. One embodiment of a set of rules is shown in Table 1.

TABLE 1

| 1 | IF | Error = Neg | AND | dF/DT = decr | THEN | change = large |
|---|----|-------------|-----|--------------|------|----------------|
| 2 |    | Error = Neg |     | dF/dt = steady |    | change = SI    |
| 3 |    | Error = Neg |     | dF/dt = incr |      | change = SI    |
| 4 |    | Error = Zero |    | dF/DT = decr |      | change = SI    |
| 5 |    | Error = Zero |    | dF/dt = steady |    | change = NC    |
| 6 |    | Error = Zero |    | dF/dt = incr |      | change = SD    |
| 7 |    | Error = Pos |     | dF/DT = decr |      | change = SD    |
| 8 |    | Error = Pos |     | dF/dt = steady |    | change = SD    |
| 9 |    | Error = Pos |     | dF/dt = incr |      | change = LD    |

SI = small increment
LI = large increment
NC = no change
SD = small decrement
LD = large decrement Using the rules above and continuing with the previous example the fuzzy Inputs of Error=Negative 0%, Zero 90%, Positive 10% and dF/dt=Decreasing 0%, Steady 80% and Increasing 20% can lead to the following fuzzy outputs and degrees of truth:

No Change=80% True (From Rule 5)
Small Decrement=20% True (From Rule 6)

Small Decrement=10% True (From Rule 8)
Large Decrement=10% True (From Rule 9)

In this case, the smallest degree of truth for a fuzzy input was used as the degree of truth for the fuzzy output. For example, for rule 5, 80% was selected because error=zero was 90% and dF/dt=steady was 80%. Rules that had a 0% degree of truth for either fuzzy input (e.g., rules for Error=Negative or dF/dt=decreasing) are not shown as the degree of truth for the fuzzy output would be 0%. The assignment of degrees of truth to the fuzzy outputs, in other embodiments of the present invention, can be a matter of choice and optimization. In yet another embodiment of the present invention, the fuzzy output with lowest degree of truth can be dropped. Fuzzy outputs can be selected in any other manner, such as selecting only the fuzzy outputs with degrees of truth above a certain value. Thus, the large decrement from rule 9 would be dropped as the large decrement has a degree of truth of only 10%. However the small decrement fuzzy output of rule 8 would not be dropped as the highest degree of truth for the small decrement fuzzy output is 20%.

Table 2 provides another example of a more complex rule table for generating fuzzy outputs. In the case of table 2, the error can be compared to five membership functions: large negative, small negative, zero, small positive and large positive, and dF/dt can be compared to five membership functions: large negative, small negative, zero, small positive and large positive. Based on the degrees of truth of the fuzzy inputs dF/dt and error, seven fuzzy outputs can be generated: very large increase, large increase, small increase, no change, small decrease, large decrease and very large decrease.

TABLE 2

| Error | DF/dt | Change |
| --- | --- | --- |
| Large Negative | Large Negative | Very Large Increase |
| Large Negative | Small Negative | Very Large Increase |
| Large Negative | Zero | Large Increase |
| Large Negative | Small Positive | Small Increase |
| Large Negative | Large Positive | No Change |
| Small Negative | Large Negative | Very Large Increase |
| Small Negative | Small Negative | Large Increase |
| Small Negative | Zero | Small Increase |
| Small Negative | Small Positive | No Change |
| Small Negative | Large Positive | Small Decrease |
| Zero | Large Negative | Large Increase |
| Zero | Small Negative | Small Increase |
| Zero | Zero | No Change |
| Zero | Small Positive | Small Decrease |
| Zero | Large Positive | Large Decrease |
| Small Positive | Large Negative | Small Increase |
| Small Positive | Small Negative | No Change |
| Small Positive | Zero | Small Decrease |
| Small Positive | Small Positive | Large Decrease |
| Small Positive | Large Positive | Very Large Decrease |
| Large Positive | Large Negative | No Change |
| Large Positive | Small Negative | Small Decrease |
| Large Positive | Zero | Large Decrease |
| Large Positive | Small Positive | Very Large Decrease |
| Large Positive | Large Positive | Very Large Decrease |

Table 2 is provided by way of example and illustrates how fuzzy inputs can be compared to additional membership functions to generate additional fuzzy outputs.

Defuzzification is the process of combining the fuzzy outputs to create a system output. For the sake of example, the fuzzy outputs from the example using Table 1 will be used. Each fuzzy output can be related to a discrete change in the system. For example, Table 3 illustrates how the fuzzy outputs of Table 1 can be associated with discrete outputs (e.g., percentage change in value).

TABLE 3

| Change | Percentage Change in Valve Output |
| --- | --- |
| Large Decrement | −20 |
| Small Decrement | −10 |
| No Change | 0 |
| Small Increment | 10 |
| Large Increment | 20 |

As shown in Table 3, for a fuzzy output of a large decrement, the percentage change in valve output should be −20%, for a small decrement −10% and so on. The fuzzy outputs can be multiplied by the appropriate constants from Table 3 and be summed together. So, for the example of fuzzy outputs from Table 1 and dropping the large decrement fuzzy output that had a degree of truth of 10%, the overall change in the flow valve would be:

Change=(0*80%−10*20%−20*10%)/(80%+20%+10%)=−3.6

Based on this value, the controller would attempt to close the valve by 3.6%. This can be done by the generation of an appropriate valve control signal at for example step 2016 of FIG. 20. In one embodiment of the present invention the valve control signal can be sent to a valve driver that can generate an analog valve drive signal to drive a valve to open or close.

EXAMPLE 1

This example illustrates the use of an embodiment of the present invention to measure and control liquid flow to enable the delivery of discrete volumes of fluid for chemical mechanical planarization substrate processing. More specifically, this example illustrates how an embodiment of the present invention may be used to measure and control liquid flow to enable the delivery of discrete volumes of a polishing fluid to a substrate. Chemical mechanical polishing is useful in the manufacture of optical lenses. Chemical mechanical planarization is useful in the manufacture of semiconductor devices. Polishing fluids may be acidic or basic and may contain abrasives such as silica or alumina. A fluid useful for polishing silicon dioxide includes silica slurry in an aqueous potassium hydroxide solution; a fluid useful for polishing copper metal includes an oxidizer such as hydrogen peroxide, an inhibitor such as benzotriazole, and an aqueous solution of an organic acid such as acetic acid.

The inlet of the device of the present invention is connected to a pressurized or gravity feed vessel containing the polishing fluid. The flow device outlet is connected to a nozzle on the polishing tool. The polishing tool has a substrate to be polished by a rotating pad or belt. The substrate is in contact with a polishing pad that removes material from the substrate along with the chemical action of the polishing fluid. Polishing fluid is delivered to the substrate on the tool through the nozzle; flow of polishing fluid to the nozzle is controlled by the flow device and its electronics. The electronics of the flow device may be connected to the tool's controller to enable the tool to control the timing of the dispense of polishing fluid onto the substrate. The tool may also contain a polishing endpoint detector that may also be used to control the timing of the delivery of polishing fluid to the substrate. The signal processor in the electronics of the flow device eliminates the variability of polishing fluid volume and delivery rate due to pressure variations in the pressurized vessel containing the polishing fluid. Compared to peristaltic pumps, delivery of polishing fluid occurs at a constant rate. The result is controlled volume and delivery rate of polishing liquid to a substrate that minimizes chemical waste and results in more uniform and repeatable polishing of the substrate.

EXAMPLE 2

This example illustrates the use of an embodiment of the present invention to measure and control liquid flow so that discrete volumes of liquid precursors can be delivered to a vaporizer to form a gas. More specifically, this example illustrates how an embodiment of the present invention may be used to measure and control the flow of liquid precursors to a vaporizer.

Liquid precursors are chemicals that are heated in a vaporizer to form a gas. The gas is then delivered to a heated substrate in a reaction chamber where it is further decomposed or reacts on the substrate. The gas may be used to form a thin film of a metal, a semiconductor, or a dielectric on the substrate (chemical vapor deposition or atomic layer chemical vapor deposition processes). It also can be used to etch the surface of a substrate, or it can be used to dry the substrate. Liquid precursors may be pure liquids such as water, 2-propanol, or tetraethyl orthosilicate, TEOS. Liquid precursors may also contain solids such as strontium dipivaloylmethane, $Sr(DPM)_2$, dissolved in a solvent such as tetrahydrofuran. Some liquid precursors, such as copper (I) hexafluoropentanedionate vinyltrimethylsilane, (VTMS)Cu(hfac), are thermally sensitive and could be decomposed by thermal sensors used in some liquid flow meters. Liquid precursors are typically delivered to the vaporizer at a rate of about 0.1 gram per minute to about 50 grams per minute. Thin films are important in the coating of optical devices such as lenses and optical fibers. Thin films and thin film etching are also important in the manufacture of flat panels, microprocessors, and memory devices.

The flow device of the present invention is connected at its inlet to a pressurized source of liquid precursor. The outlet of the flow device is connected to a vaporizer. The valve for the flow device can be upstream or downstream of the vaporizer. The outlet of the vaporizer is connected to the tool's process chamber that contains the substrate to be treated by the vapor. For processes requiring multiple precursors, multiple flow devices can be used. The electronics of the flow device may be connected to the tool's controller. This permits the process tool to remotely control the flow of liquid from the pressurized source through the flow meter and into the heated vaporizer. Examples of vaporizers useful for chemical vapor deposition processes include heated metal frits, heated metal screens, heated valves, and heated tubing.

Pressure variations in the vessel containing the liquid precursor can result in changes of liquid flow to the vaporizer. Thermal decomposition of a liquid precursor in a thermal flow element can result in inaccurate liquid flow to the vaporizer. Poor flow control to the vaporizer can result in incomplete vaporization of the liquid due to vaporizer saturation. Incomplete vaporization will cause liquid droplets to enter the process chamber and cause defects on the substrate. The result of practicing this invention is the elimination of thermal flow element to control precursor flow and a repeatable and controlled flow of liquid to the vaporizer regardless of upstream pressure fluctuations.

EXAMPLE 3

This example illustrates the use of an embodiment of the present invention to measure and control liquid flow to enable the delivery of fluid to a substrate for electroless plating. More specifically, this example illustrates how an embodiment of the present invention can be used to measure and control liquid flow to enable the dispense of a series of chemicals onto a substrate to form a metal film in plating processes. Such a process eliminates drag out of chemicals common to bath plating processes. Solutions of metals and metal alloys useful for plating include, but are not limited to, silver, copper, platinum, palladium, gold and tin. Catalysts are often required to activate the substrates to the plating solution. These catalysts include colloidal palladium, carbon, graphite, tin-palladium colloids, and conductive polymers like polypyrrole. The precious metals in some of these catalysts and plating solutions are expensive and waste during the plating process needs to be minimized to make the plating process cost effective. The metals in some of these solutions are toxic and waste during the plating process needs to be minimized to reduce environmental discharge as well as waste processing and disposal costs.

For each chemical used in the plating process, the device of the present invention is connected at its inlet to a pressurized, pump fed, or gravity fed source of the chemical. The outlet of the device is connected at its outlet to a nozzle for delivering each chemical to the substrate. The temperatures of the solutions may be decreased or increased prior to delivery to the substrate using a heat exchanger, chiller, or resistive heater element. For example, copper metal may be deposited onto a substrate by an electroless process by contacting the substrate through a first flow device with an activator solution containing colloidal palladium, rinsing the substrate with water using a second flow device, contacting the catalyzed substrate through a third flow device with a hydrochloric acid activating solution, contacting the substrate through a fourth flow device with a volume of copper solution containing a source of cupric ion, a reducing agent such as formaldehyde, a complexing agent such as EDTA, and a base such as potassium hydroxide. The substrate is washed with water from the second flow device.

The electronics of the flow devices may be connected to the plating tool's controller to regulate the timing, duration, and order of liquid flow through each flow device. The result is rapid and precise delivery of measured volumes of each chemical to the substrate for each step in the process. Chemical waste and materials costs are minimized by delivering only enough chemical to the substrate to ensure complete reaction. Contamination of the substrate due to chemical drag out is reduced. The overall throughput of the process is increased because of the rapid action of the flow element and valve to reduce cycle time.

EXAMPLE 4

This example illustrates the use of an embodiment of the present invention to measure and control liquid flow to enable delivery of a fluid to a substrate to form a conformal coating. More specifically, this example illustrates how a device of the present invention can be used to measure and control liquid flow to a substrate to enable precise coating of the substrate with the liquid material. Dielectric materials, photoresists, antireflective coatings, polyimides, adhesion promoters such as hexamethyldisilazane, ferroelectric materials, and sol-gels are commonly deposited as liquids or slurry onto a substrate in a spin coating process. Such materials are delivered to a stationary or slowly rotating substrate by a fixed or movable nozzle. After the material has been delivered to the substrate, it is rotated at high speeds ranging from about 100 to 5000 rpm to uniformly coat the substrate with a thin film of the liquid material. Many of these materials are costly and it is important to minimize their usage and waste in the coating process. Repeatable coatings require that consistent volumes of material be delivered to the substrates.

The inlet of the flow device of the present invention is connected to a pressurized or gravity fed vessel containing the coating fluid. The flow device outlet is connected to a nozzle on the coating tool. The coating tool has a substrate mounted to a rotating chuck. The coating fluid is delivered to the substrate on the tool through the nozzle; flow of coating fluid to the nozzle is controlled by the flow device and its valve. The electronics of the flow device may be connected to the tool's controller to enable the tool to control the timing and rate of coating fluid onto the substrate. By electronic communication with the flow device, the coating tool may vary the fluid flow rate onto the substrate as a function of nozzle position and substrate rotation rate in order to achieve a desired coating. The microprocessor and control logic of the flow device eliminates the variability of coating fluid volume and delivery rate due to pressure variations in the vessel containing the coating fluid. The result is the delivery of a controlled volume of coating fluid to the substrate. This result minimizes chemical waste and results in more uniform and repeatable coating of such substrates.

EXAMPLE 5

This example illustrates the use of an embodiment of the present invention to measure and control liquid flow to enable the delivery of a fluid to a substrate for reaction with the substrate. More specifically, this example illustrates how an embodiment of the present invention can be used to measure and control the flow of a reactive liquid onto a substrate. Examples of such reactive liquids include, but are not limited to, positive or negative photoresist developers, photoresist strippers, acids such as hydrofluoric acid, oxidants such as ozonated deionized water, or etchants such as peroxyacetic acid.

The inlet of a flow device of the present invention is connected to a pressurized or gravity fed vessel containing the reactive fluid. The flow device outlet is connected to a nozzle or a spray nozzle on the tool. The reactive fluid is delivered to the substrate on the tool through the nozzle; flow of reactive fluid to the nozzle on the tool is controlled by the flow device and its valve. The electronics of the flow device may be connected to the tool's controller to enable the tool to control the timing and rate of reactive fluid flow onto the substrate. The electronics of the flow device may be connected through the tool's controller to a reaction endpoint detector whereby the flow rate of reactive fluid is reduced or stopped as the reaction endpoint is approached or is reached. An example of an etchant process is the removal of copper from the edges of plated wafers using peroxyacetic acid. The result is the delivery of a controlled volume of reactive fluid to the substrate and accurate control of the process endpoint using an embodiment of the present invention.

EXAMPLE 6

This example illustrates the use of an embodiment of the present invention in series with chemical sensors to measure and control liquid flow and composition. More specifically, this example illustrates how an embodiment of the present invention can be combined with one or more chemical sensors to enable the control of fluid flow and fluid composition. Applications where such control is desirable include but are not limited to plating baths, RCA cleaning baths, ozonated water baths, and hydrofluoric acid baths. Other applications combining such sensors with an embodiment of the present invention include maintaining the purity of a chemical bath.

For example, the build up of contaminants, such as particles, organic materials, or metal ions, in a recirculating bath may require that the bath be periodically bled of contaminated fluid and replaced with an equivalent volume of uncontaminated fluid. Alternatively, the bath may be switched to a purifier or particle filter to remove the contaminants while maintaining a constant flow rate in order to protect the current process and product until the contamination can be removed.

Ozone dissolved in deionized water is used for the removal of organic materials from the surfaces of various substrates. Fluctuations in ozone generator output gas concentration and water flow rate leads to variations in dissolved ozone concentration. Such dissolved ozone concentration changes lead to variation in the time required to oxidize the substrate surface with the ozonated water and causes inconsistent process results and cleaning times.

To maintain the concentration of dissolved ozone in an overflow cleaning bath, an embodiment of the present invention is connected to a source of deionized water at its inlet and its outlet is connected to a gas contactor. A gas contactor is a mass transfer device capable of dissolving gases into liquids. Examples of such devices and a description of their operation are available from W. L. Gore, Elkton, Md., and Mykrolis Corporation, Billerica, Mass. Ozone gas from an ozone generator is delivered to the shell side of the gas contactor where it dissolves into the deionized water flowing through the tubes of the gas contactor. The concentration of ozone dissolved in the water is measured by a dissolved ozone concentration monitor, available from IN USA, Needham, Mass., connected to the fluid outlet of the gas contactor. The output signal from the dissolved ozone concentration monitor is used as an input signal into the electronics and microprocessor of the flow device of the present invention. The electronics, microprocessor, and control logic of the present invention will vary the flow rate of water through the gas contactor, within preset limits, in order to maintain the concentration of dissolved ozone within a predetermined concentration range. For example, if the concentration of ozone gas output from the ozone generator decreases, the flow of water through the gas contactor can be decreased by the flow device to maintain the dissolved ozone concentration.

Alternatively, the electronics of the flow device of the present invention can be used to vary the ozone generator gas flow rate, or power level, by use of its analog outputs or RS485 output or other suitable means while maintaining a fixed water flow rate through the gas contactor regardless of water pressure upstream of the flow device. For example, if the concentration of dissolved ozone exceeds a predetermined threshold while the flow of water is constant, the power to the generator can be decreased to reduce the concentration of dissolved ozone back to its proper level. The result is a controlled preparation and delivery of a chemical mixture of constant composition to a substrate by the use of an embodiment of the present invention.

EXAMPLE 7

This example illustrates the use of a venturi system with a heat exchanger to repeatedly heat and measure and control liquid flow to enable the dispense of a volume liquid at room temperature to a high temperature for subsequent processing.

Figure 11:
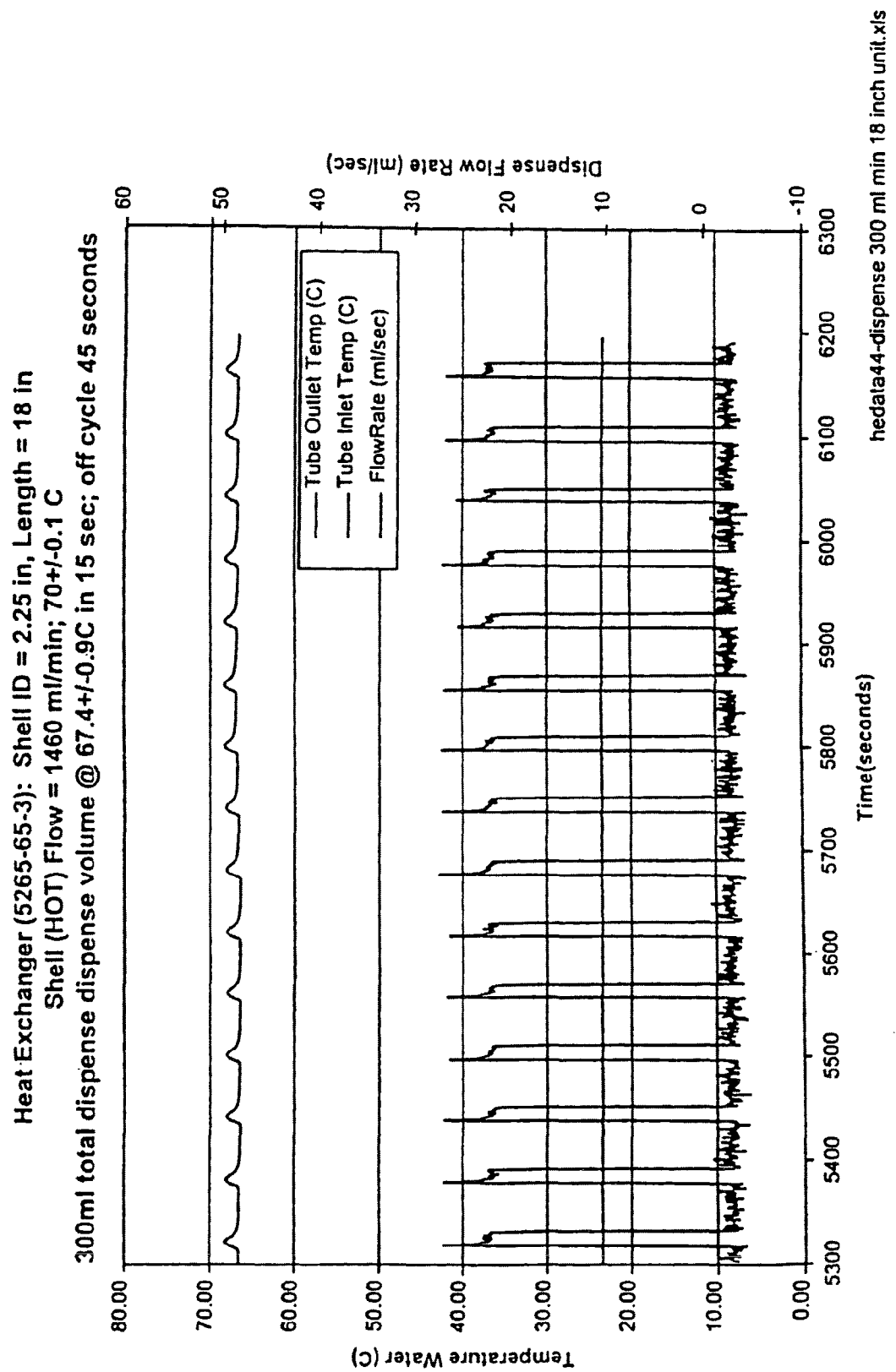
FIG. 11 is a graph of heat exchanger tube inlet and outlet water temperature and measured flow rate in accordance with Example 7.

A 2.25 inch inside diameter by 18 inch length shell and tube heat exchanger, prepared by the method disclosed in the above-referenced U.S. Pat. No. 7,249,628, was connected on its shell side to a source of water heated to 70 degrees Celsius flowing at a rate of 1.46 liters per minute. A source of water at 23 degrees Celsius was connected to an embodiment of the present invention at its inlet. The outlet of the valve in the present embodiment was connected to the inlet fitting of the tube side of the heat exchanger. Temperature of the water inlet to the tube side and the outlet of the tube side of the heat exchanger were measured by J-type thermocouples and data were logged using an Agilent data logger. The flow rate and timing of liquid water dispense cycles into the tubes of the heat exchanger was controlled by the flow device electronics and a laptop computer. The dispense cycle each minute was: water delivered to the tubes for 15 seconds at a flow rate of about 20 milliliters per second, water flow stopped for 45 seconds. A plot of the heat exchanger tube inlet water temperature, tube outlet water temperature and measured flow rate for a number of dispense cycles is shown in FIG. 11. The results show repeatable delivery of 300 milliliter volumes of liquid heated from 23 to 67±0.9 Celsius by this embodiment of the present invention with a heat exchanger. Such a system could be used for conditioning the temperature of fluids used in single wafer cleaning, electroless plating, developer or resist stripping processes.

EXAMPLE 8

This example illustrates the use of a venturi flow system to enable the delivery of a fixed volume of liquid at a fixed flow rate with precisely controlled temperature.

Figure 12:
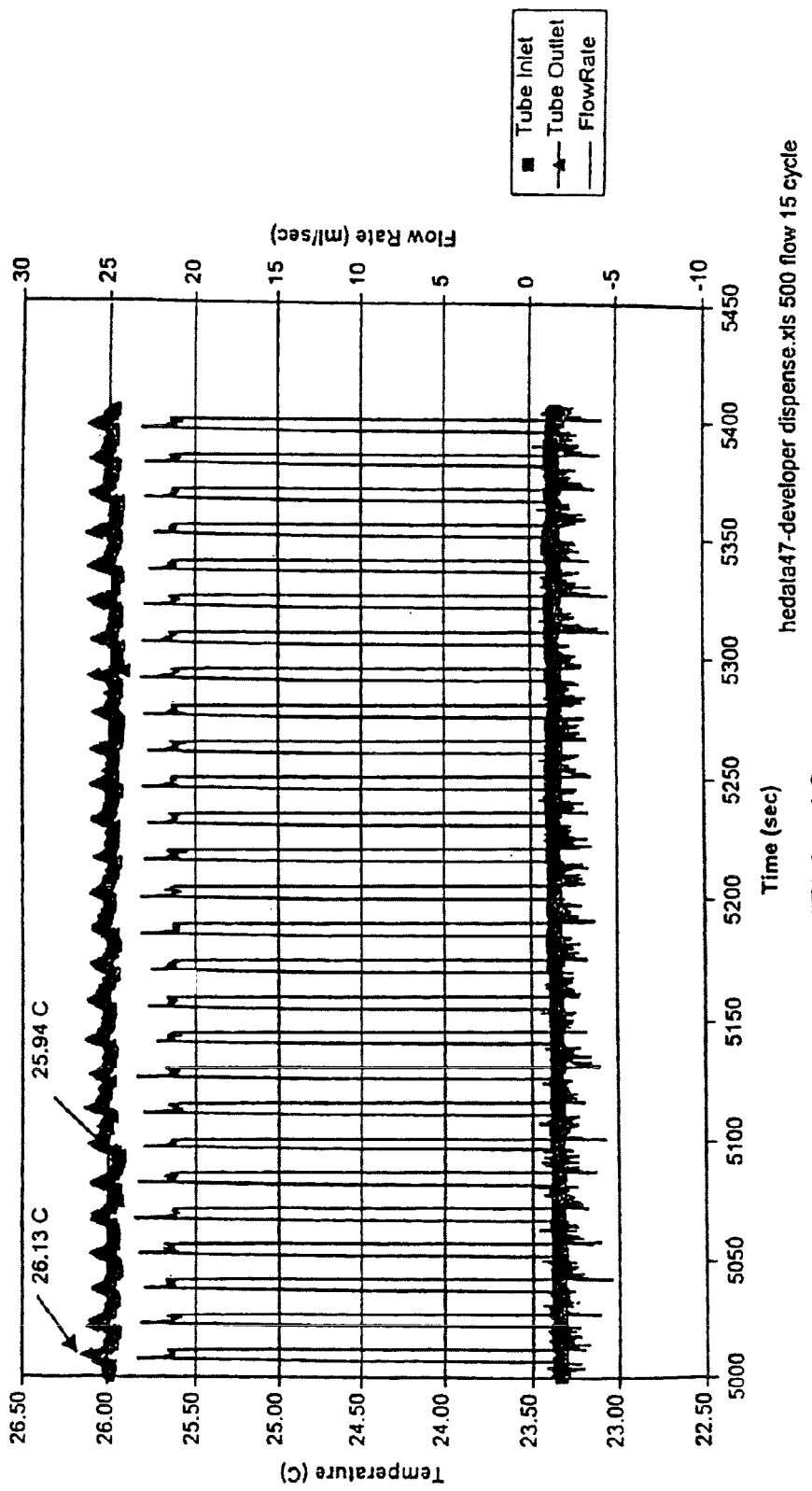
FIG. 12 is a graph of heat exchanger tube inlet and outlet water temperature and measured flow rate in accordance with Example 8.

A 2.25 inch inside diameter by 8 inch length shell and tube heat exchanger, prepared by the method disclosed in the above-referenced U.S. Pat. No. 7,249,628, was connected on its shell side to a source of water heated to 26.8 degrees Celsius flowing at a rate of 0.5 liters per minute. A source of water at 23.4 degrees Celsius was connected to an embodiment of the present invention at its inlet. The outlet of the valve in the present embodiment was connected to the inlet fitting of the tube side of the heat exchanger. Temperature of the water inlet to the tube side and the outlet of the tube side of the heat exchanger were measured by J-type thermocouples and data was logged using an Agilent data logger. The flow rate and timing of liquid water dispense cycles into the tubes of the heat exchanger were controlled by the flow device electronics and a laptop computer. The dispense cycle each minute was: water delivered to the tubes for 5 seconds at a flow rate of about 20 milliliters per second, water flow stopped for 10 seconds. A plot of the heat exchanger tube inlet water temperature, tube outlet water temperature, and measured flow rate for a number of dispense cycles is shown in FIG. 12. The results show repeatable delivery of 100 milliliter volumes of liquid maintained at a temperature of 26.035+/− 0.095 C using embodiment of the present invention with a heat exchanger. Such a combination could be used for accurately maintaining the temperature of a fluid such as a photoresist.

EXAMPLE 9

This example illustrates the use of a capillary system to measure and control liquid flow to enable the delivery and control of low volumetric flows of an organic liquid.

A 40 inch length of PFA tubing having an inside diameter of 0.058 inches and about 14 twists is useful as a pressure drop element. Temperature of the inlet fluid, for example 2-propanol, should be about 23 degrees Celsius and can be measured by a thermistor on the surface of the flow restriction element with temperature input to the temperature sensor input module of the electronics system as shown in FIG. 21. 2-propanol is in a vessel pressurized at about 20 pounds per square inch gauge with nitrogen or argon gas. 2-propanol flow rate is modulated by the controller setpoint. The setpoint can be input to the microprocessor by an external tool controller through the RS485 or auxiliary analog input modules, as shown in FIG. 21, of the electronics system. The result is a flow system capable of delivering a liquid at flow rates ranging from about 0.008 grams per second (0.16 grams per minute) to about 0.5 grams per second (9.6 grams per minute). Such a flow system is capable of controlling liquid at flow rates suitable for chemical vapor deposition processes.

EXAMPLE 10

This example illustrates the use of an algorithm with a venturi system to maintain constant volume dispense during a change in upstream supply pressure.

An embodiment of the flow device of the present invention device was assembled using a concentric venturi, Teflon®, ⅜ inch Flaretek® fittings, flow element, two NPI-19 series pressure sensors from LucasNovaSensor, Fremont, Calif., and a proportioning control valve EAD stepper motor, model LIMGE-10×03 with modified lead screw and a Sager electric positioning sensor model EE-SX770PR for determining the stepper motor and valve homing position. The valve body was from Parker, model PV-10 with modified poppet. The pressure sensors and valve were interfaced with electronic hardware. Flow rate and pressure output from the flow device electronics was recorded on an IBM compatible computer using a graphical user interface.

The inlet of the venturi flow element was connected to a pressurized source of water. The water was contained in a ballast tank supplied with pressure by a model 405A liquid pump and pressure switch from Micropump, Vancouver, Wash. The pressure in the ballast tank was allowed to cycle between 20 and 33 pounds per square inch gauge. Liquid dispense mass from the flow device was measured on a Mettler Toledo PR8002 balance and recorded on an IBM PC compatible computer.

The dispense time for the flow device was about 10 seconds on and about 20 seconds off. Programmed flow rates of 10, 15, and 20 milliliters per second, for total dispense volumes of 100, 150, and 200 milliliters, were repeated a total of 23 times as the pressure in the ballast tank changed between 20 and 33 pounds per square inch.

Figure 14:
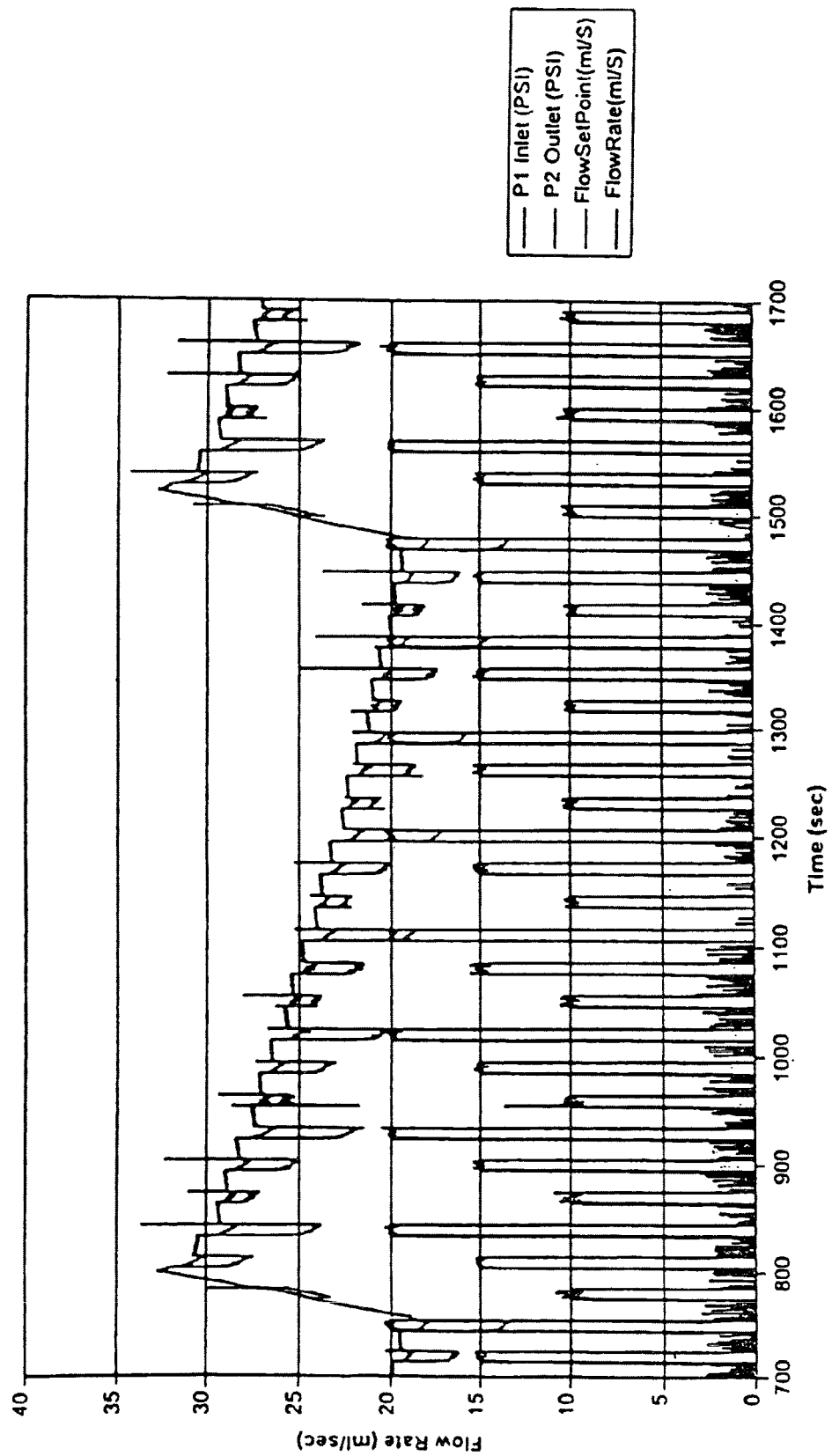
FIG. 14 is a graph of flow rate versus time in accordance with Example 10.

A portion of the results is shown in FIG. 14. The results show an electronic control system for modulating the flow of fluid through the restrictive flow element with temperature and pressure sensor inputs into a microprocessor. The microprocessor has capability for storing and accessing stored tabulated or functional relationships between kinematic viscosity and temperature of a number of fluids and has the capability for calculating a temperature corrected pressure drop. The results further illustrate the ability of the flow device and electronic system to deliver consistent volumes of liquid as the upstream pressure of the liquid changes. In the microprocessor, the total volume of fluid dispensed per unit time is calculated, summed, and compared to the setpoint. Corrections to the dispense time are made by the control logic to adjust for pressure changes in the system and maintain the dispense volume and flow rate. The dispense volume determined from the balance data for the 23 dispenses was 100.97, 151.23, and 201.50 milliliters with standard deviations as a percent of dispense less than 0.4.

EXAMPLE 11

This example illustrates the use of an algorithm with an embodiment of the present invention to calibrate a flow device for use in multiple fluids using a single standard calibration fluid. For a venturi flowmeter, the equation developed here is used to calculate the volumetric flow rate for any liquid. FIG. 22 is a description of the theory relating fluid flow in a venturi to pressure drop, cross sectional area, and fluid viscosity. If one were to consider in FIG. 22 the term $$\frac{A_a}{\sqrt{\left(\frac{A_a}{A_b}\right)^2 - 1}}$$

as the 'geometric coefficient', one could replace it and the discharge coefficient, C, with a single combined calibration coefficient, C'. The resulting equation can be generalized to the form $Q=C'(2\Delta p/\rho)^n$, where the exponent n is approximately 0.5 and is determined experimentally.

Figure 15:
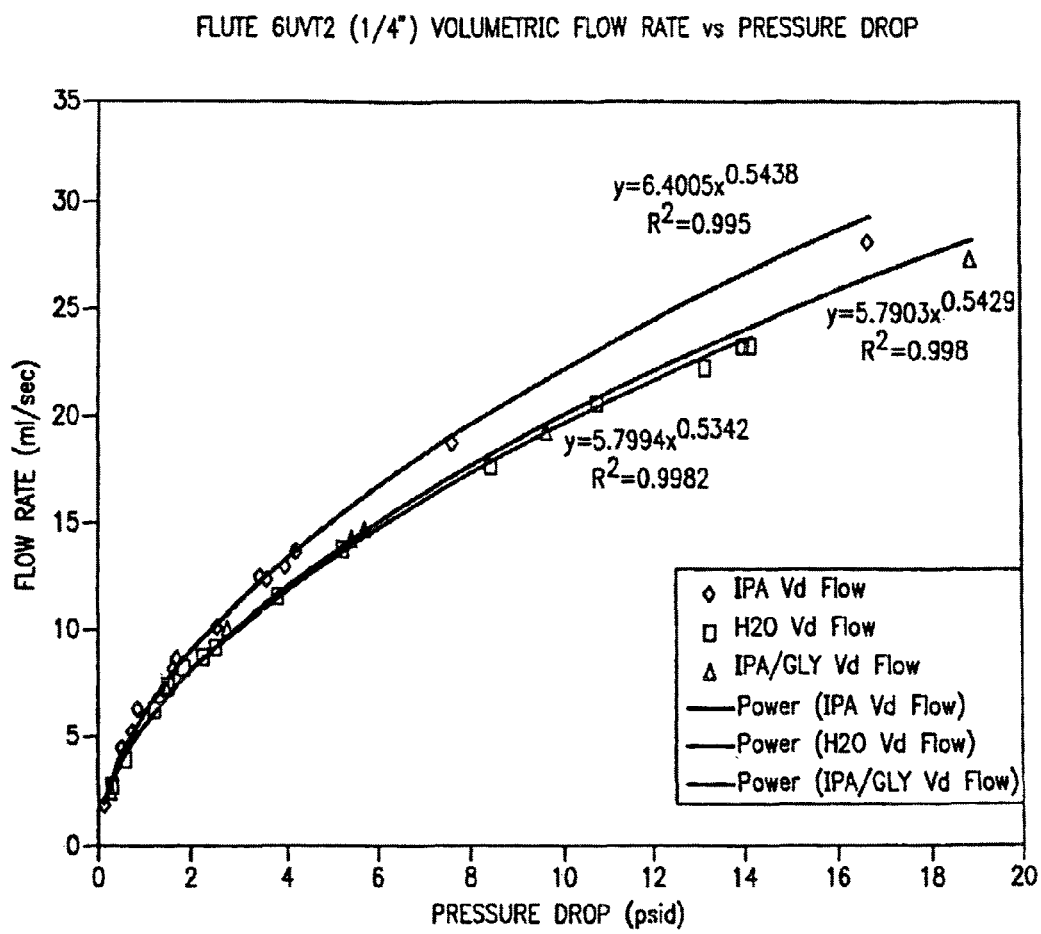
FIG. 15 is a graph of flow rate versus pressure drop in accordance with Example 11.

Take flow meter with two pressure sensors and place on a test stand having a pressure standard and a flow standard. Measure the fluid flow as a function of the output of the pressure sensor difference for at least two fluids. FIG. 15 shows the results of such measurements for three fluids: water, 2-propanol, and a glycerine 18%/2-propanol 82% w/w mixture. Fit each fluid data set using a power function having a pre-exponential coefficient and exponent.

Figure 16:
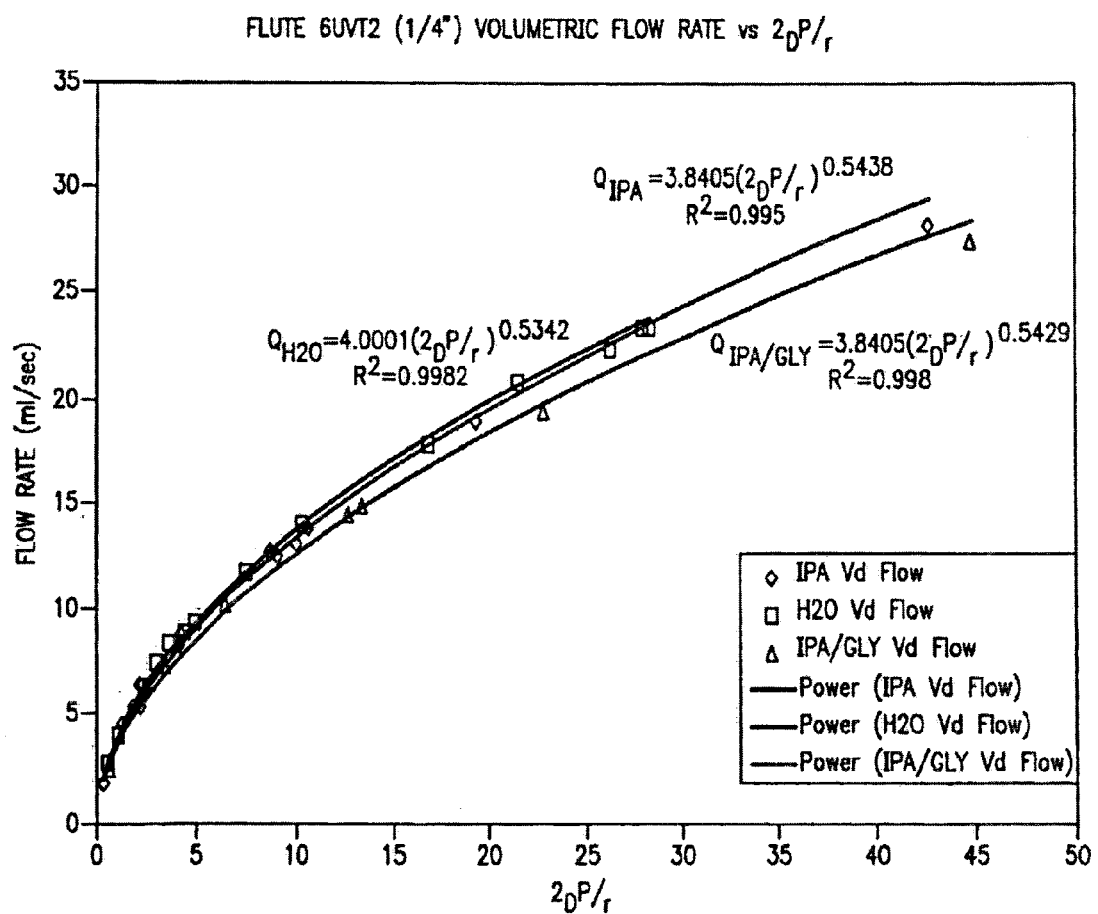
FIG. 16 is a graph of flow rate versus $2\Delta p/\rho$. in accordance with Example 11.

Since $C'=Q/(2\Delta p/\rho)^n$, one could plot 'Q' vs '$2\Delta p/\rho$', to obtain values of C' as shown in FIG. 16 and determine a calibration coefficient and an exponent from a mathematical relationship between the flow rate, the fluid density, and the pressure drop data for each fluid. For example, a best fit of the data for each fluid using a power function mathematical relationship gives a function having a pre-exponential coefficient C' and an exponent n. In FIG. 16, the pre-exponential factor C' for water is 4.0001 and the exponent n is 0.5342.

Figure 17:
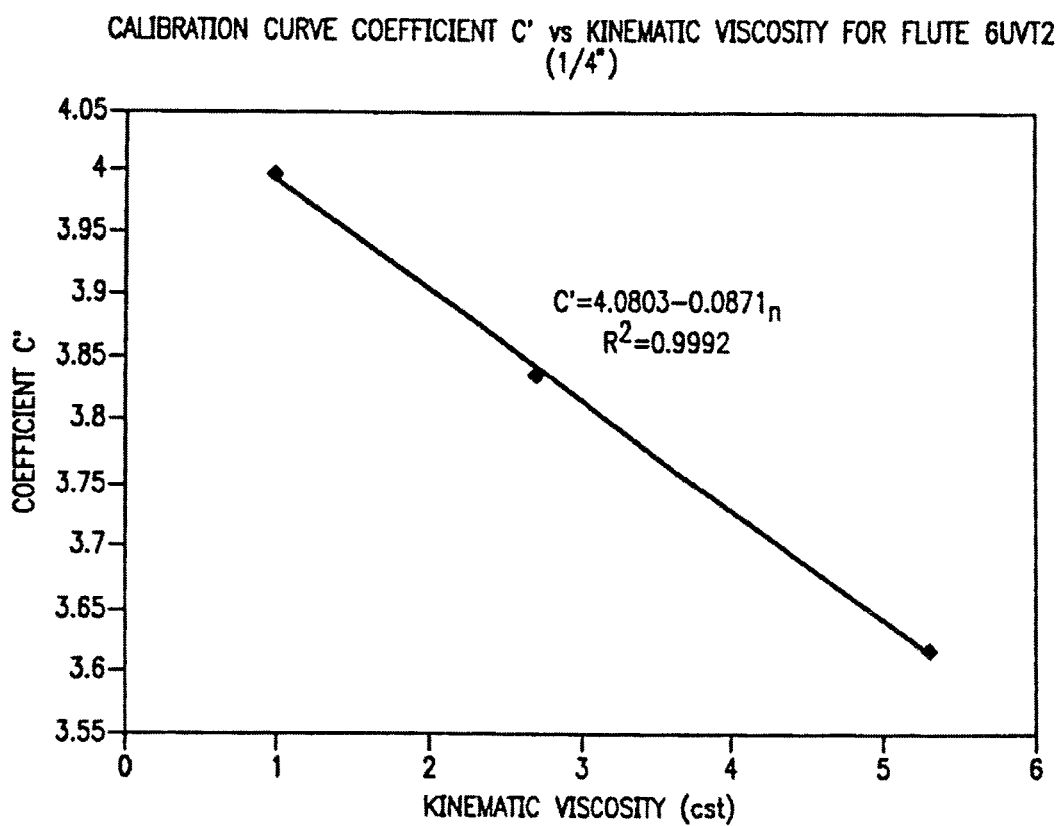
FIG. 17 is a graph of the coefficient C' versus kinematic viscosity in accordance with Example 11.

Although the exponents, n, of the power curve fit equations of all three curves in FIG. 16 are about 0.54, the C' calibration coefficient pre-exponential factors are different for each fluid. These coefficients are plotted against each fluid's kinematic viscosity .upsilon., as shown in FIG. 17 and a mathematical relationship between the calibration coefficient C' and the kinematic viscosity for each fluid is determined. For example, the best fit straight line yields the value of C' as a function of kinematic viscosity as shown in FIG. 17.

The ability to determine the value of the coefficient C' allows one to calculate the flow rate of any fluid flowing through the particular venturi meter within the flow and kinematic viscosity ranges investigated (provided the flow is turbulent).

In a preferred embodiment this flow model may be further refined to compensate for temperature dependent changes in fluid properties ($\mu$ and $\rho$) by defining a new coefficient 'K' which incorporates the C' coefficient and variable fluid properties so that the flow equation becomes $Q=K\Delta P^n$, where $K=C'(2/\rho)^n$.

Figure 18:
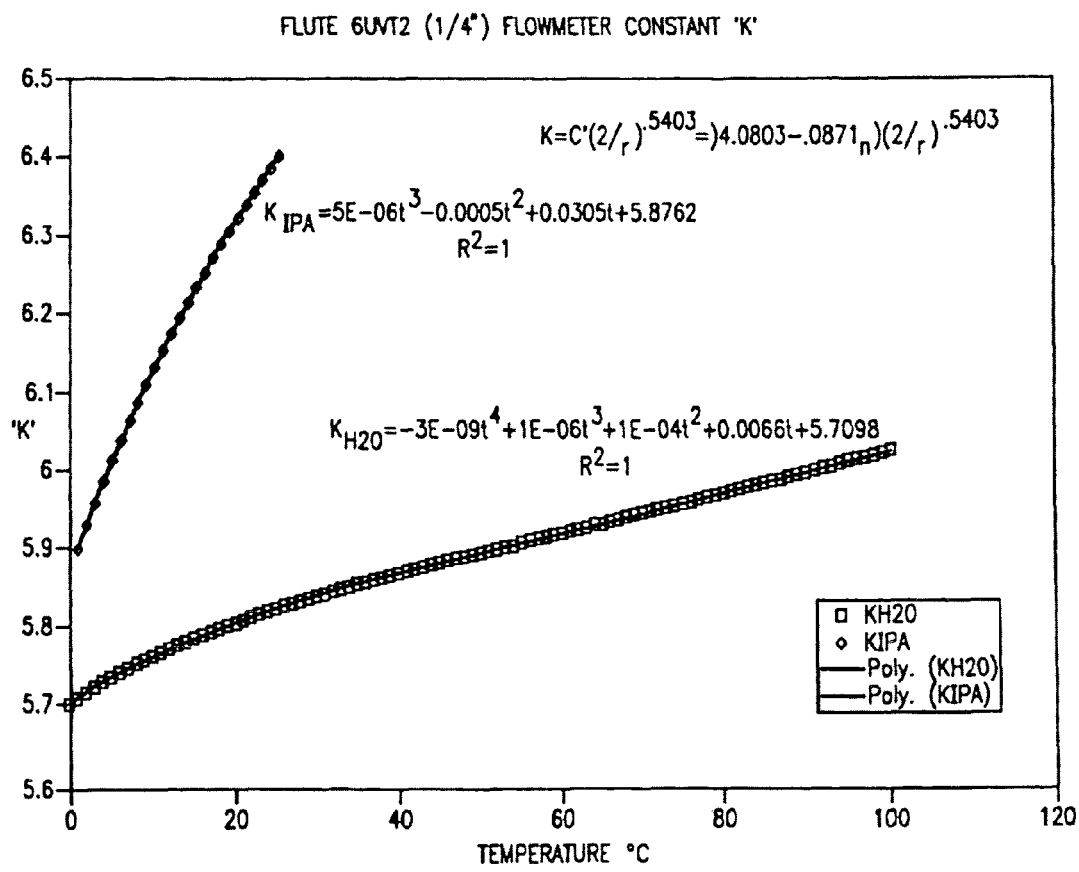
FIG. 18 is a graph of "K" versus temperature in accordance with Example 11.

For a concentric venturi flow sensor, the relationship between 'K' and temperature for $H_2O$ and IPA is shown in FIG. 18. These data are available in the International Critical Tables of Numerical Data. From these data a mathematical relationship between the calibration coefficient 'K' and the kinematic viscosity for each fluid as a function of temperature is determined. For example a best fit polynomial, preferred for the present invention, to this data gives K as a function of temperature as shown in FIG. 18 for IPA and water.

Figure 19:
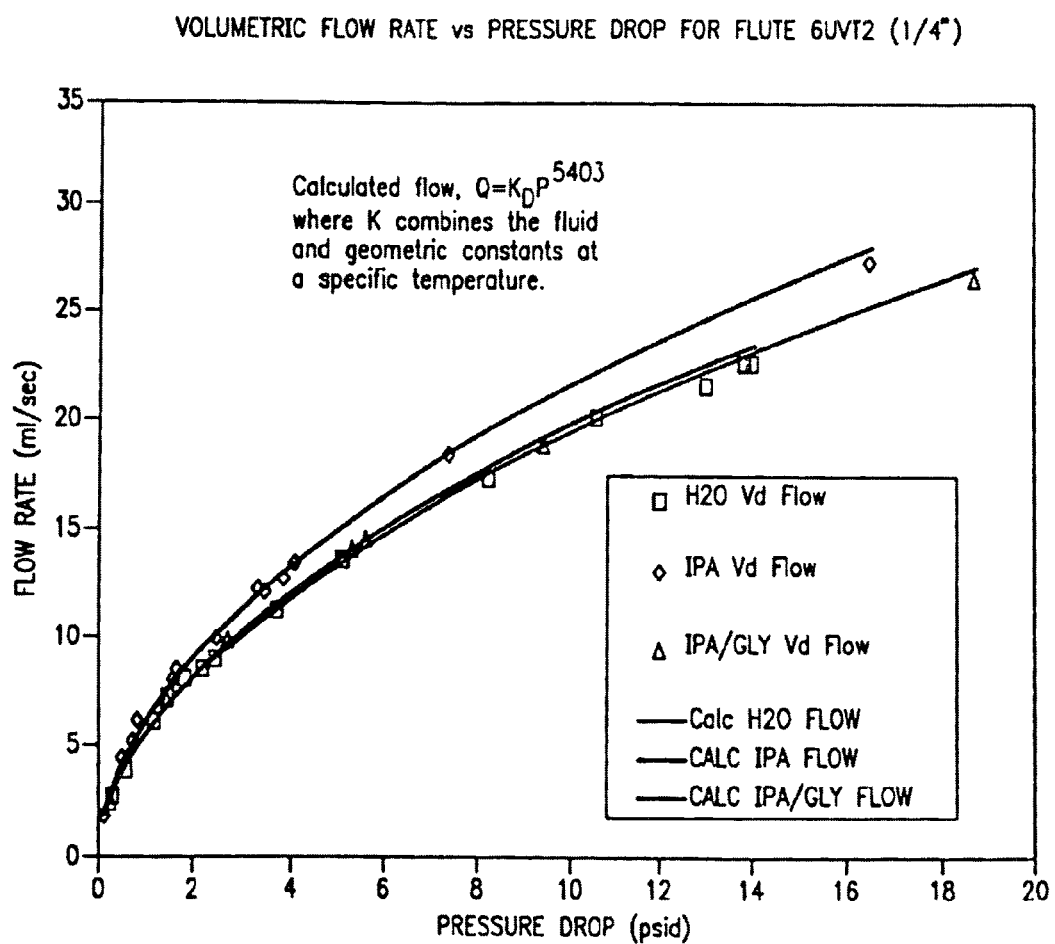
FIG. 19 is a graph of flow rate versus pressure drop in accordance with Example 11.

In order to verify the model, one may compare the flow rate versus pressure drop data to the calculated flow rate. This is shown in FIG. 19 for water and IPA using K and temperature of 24.0° C. for water and 23.6° C. for IPA. The results for glycerine/IPA is calculated based only on C' (no temperature correction).

If one has enough calibration data on a particular venturi meter design, that is the design is well characterized, if the exponent, 'n' of the flow equation '$Q=C'(2\Delta P/\rho)^n$' is constant, and that the slope 'm' of the coefficient equation, '$C'=b-m_\upsilon$', is also constant, it should be possible to calibrate other venturi meters of that design with a single flow rate, using a single fluid, at a known temperature. Once a flow meter is calibrated, the device can be used in other fluids whose kinematic viscosity and density as a function of temperature have been inputted to the memory of the electronic circuit or microprocessor.

To accommodate variations in venturi meter dimensions due to manufacturing tolerances, the only unknown, the value of 'b' in the coefficient equation, may be determined from the relationship $b=C'+m_\upsilon$; since the value of 'm', the slope, is known, and $C'=Q/(2\Delta P/\rho)^n$ (Q and $\Delta P$ are from the flow rate vs. pressure drop data point, and kinematic viscosity $\upsilon$ and density $\rho$ are the kinematic viscosity and density of the calibration fluid respectively) then $b=Q/(2\Delta P/\rho)^n+m_\upsilon$.

The invention claimed is:

1. A method for controlling the dispense of fluid from a dispenser to a point of use, comprising:
    sensing a pressure drop across a restrictive flow element, wherein the restrictive flow element is in fluid communication with a fluid inlet of a proportional fluid flow valve; and
    modulating the proportional fluid flow valve based on application of fuzzy logic to a change in a flow rate over time (dF/dt) and a flow rate error, wherein the flow rate is calculated based on the pressure drop across the restrictive flow element and wherein the application of fuzzy logic comprises fuzzification, rule evaluation and defuzzification of the change.

2. The method according to claim 1, wherein the application of fuzzy logic further comprises:
    comparing dF/dt to a set of dF/dt membership functions to determine a degree of truth for each dF/dt membership function;
    comparing the flow rate error to a set of error membership functions to determine a degree of truth for each error membership function; and
    generating a fuzzy output based on the degrees of truth for the dF/dt membership functions and the degrees of truth for the error membership functions.

3. The method according to claim 2, wherein the fuzzy output corresponds to a change to be applied to the proportional fluid flow valve.

4. The method according to claim 2, wherein the generating step further comprises:
    selecting a smallest degree of truth for the dF/dt membership functions;
    selecting a smallest degree of truth for the error membership functions; and
    generating the fuzzy output based on the smallest degree of truth for the dF/dt membership functions and the smallest degree of truth for the error membership functions.

5. The method according to claim 2, wherein the set of error membership functions comprises a negative error membership function, a neutral zero error membership function, and a positive error membership function.

6. The method according to claim 1, wherein fuzzification, rule evaluation and defuzzification comprise:
    quantizing input variables into a set of fuzzy inputs with varying degrees of truth;

generating a set of fuzzy outputs with varying degrees of truth based on the set of fuzzy inputs; and generating a system output based on two or more of the set of fuzzy outputs.

7. The method according to claim 6, further comprising: dropping a fuzzy output having lowest degree of truth among the set of fuzzy outputs.

8. The method according to claim 6, further comprising: selecting only fuzzy outputs with degrees of truth above a predetermined value.

9. The method according to claim 6, wherein each of the set of fuzzy outputs is associated with a discrete change in a valve output.

10. The method according to claim 1, wherein an actuator is provided to modulate the proportional fluid flow valve.

11. The method according to claim 10, wherein a controller responsive to the measured pressure drop is provided to control the actuator.

12. A method for controlling the dispense of fluid from a dispenser to a point of use, comprising:

sensing a pressure drop across a restrictive flow element, wherein the restrictive flow element is in fluid communication with a fluid inlet of a proportional fluid flow valve;

determining a flow rate based on the pressure drop across the restrictive flow element;

applying fuzzy logic rules to a change in the flow rate over time and a flow rate error; and modulating the proportional fluid flow valve based on the application of fuzzy logic rules to the change in the flow rate over time and flow rate error.

13. A method for controlling the dispense of fluid from a dispenser to a point of use, comprising:

providing a proportional flow valve having a fluid inlet and a fluid outlet;

providing a restrictive flow element in fluid communication with the fluid inlet, the restrictive flow element creating a pressure drop;

providing an upstream pressure sensor and a downstream pressure sensor; and providing a controller in communication with the upstream pressure sensor and the downstream pressure sensor, wherein the controller is operable to:

receive an upstream pressure signal from the upstream pressure sensor;

receive a downstream pressure signal from the downstream pressure sensor;

calculate a flow rate based on the upstream pressure signal and the downstream pressure signal;

apply fuzzy logic rules to a change in a flow rate over time (dF/dt) and a flow rate error; and determine how much to modulate the proportional flow valve based on the application of the fuzzy logic rules to the change in the flow rate over time and flow rate error.

14. The method according to claim 13, wherein the controller is further operable to:

compare a flow rate error to a first set of membership functions to generate a first set of fuzzy inputs; and compare a change in flow rate over time (dF/dt) to a second set of membership functions to generate a second set of fuzzy inputs;

wherein each fuzzy input from the first set of fuzzy inputs and the second set of fuzzy inputs is associated with an input degree of truth.

15. The method according to claim 14, wherein the controller is further operable to apply a first set of rules to the first set of fuzzy inputs and the second set of fuzzy inputs to generate a set of fuzzy outputs, wherein each fuzzy output is associated with an output degree of truth.

16. The method according to claim 15, wherein the controller is further operable to:

associate each fuzzy output with a discrete change in valve output; and calculate the overall change in valve output based on the output degree of truth of one or more of the fuzzy outputs and the discrete change in valve output value associated with each of the one or more fuzzy outputs.

17. The method according to claim 16, wherein the controller further comprises a valve driver operable to generate a valve drive signal based on a valve control signal, wherein the valve control signal is based on the change in valve output.

18. The method according to claim 13, wherein the application of the fuzzy logic rules further comprises:

quantizing a change in the flow rate over time and a flow rate error into a set of fuzzy inputs;

generating a set of fuzzy outputs based on the set of fuzzy inputs; and generating a system output based on the set of fuzzy outputs.

19. The method according to claim 18, further comprising: adjusting the proportional flow valve based on the system output.

20. The method according to claim 19, further comprising: providing an actuator for adjusting the proportional flow valve.

* * * * *